US012694125B2

(12) United States Patent　　(10) Patent No.:　US 12,694,125 B2
Hanily et al.　　　　　　　　　　(45) Date of Patent:　　　Jul. 28, 2026

(54) DETECTING INTER-TENANCY EXFILTRATION IN A CLOUD ENVIRONMENT

(71) Applicant: Oracle International Corporation, Redwood Shores, CA (US)

(72) Inventors: Peter Martin Hanily, Dublin (IE); Ryan Daniel Schilcher, Seattle, WA (US); Christopher Robert Baker, Nashua, NH (US); Jonathan Philip Taimanglo, Arlington, VA (US)

(73) Assignee: Oracle International Corporation, Redwood Shores, CA (US)

( * ) Notice: Subject to any disclaimer, the term of this patent is extended or adjusted under 35 U.S.C. 154(b) by 70 days.

(21) Appl. No.: 18/895,085

(22) Filed: Sep. 24, 2024

(65) Prior Publication Data

US 2026/0087143 A1　　Mar. 26, 2026

(51) Int. Cl.
　　*G06F 21/57*　　　(2013.01)
　　*G06F 21/55*　　　(2013.01)
(52) U.S. Cl.
　　CPC .......... *G06F 21/577* (2013.01); *G06F 21/554* (2013.01)
(58) Field of Classification Search
　　CPC .............................. G06F 21/577; G06F 21/554
　　See application file for complete search history.

(56) References Cited

U.S. PATENT DOCUMENTS 9,210,183 B2　12/2015　Sadovsky et al.
9,374,369 B2　6/2016　Mahaffey et al.

9,516,053 B1　12/2016　Muddu et al.
9,692,789 B2　6/2017　Kirti et al.
9,729,675 B2　8/2017　Luecke et al.
(Continued)

FOREIGN PATENT DOCUMENTS

IN　　202311067931 A　　12/2023

OTHER PUBLICATIONS

Exabeam, "Maire Selects Exabeam to Improve Global Cybersecurity Posture and Analyst Efficiency", 2025, https://www.exabeam.com/platform/logrhythm-intelligence/.

(Continued)

*Primary Examiner* — Sangseok Park
(74) *Attorney, Agent, or Firm* — Mughal Gaudry & Franklin PC

(57)　　　　　ABSTRACT

Techniques for detecting inter-tenancy exfiltration of data in a cloud environment are disclosed. A log that includes information associated with receipt of a service message at a gateway within a cloud environment is accessed. Based on the log, (i) originating information of the service message (such as identification of an originating tenancy of the service message) and (ii) target information of the service message (such as identification of a target tenancy of the service message) are determined. The originating information and the target information are compared. A mismatch between the originating information of the service message and the target information of the service message is detected. In response to the detected mismatch between the originating information of the service message and the target information of the service message, information indicative of the detected mismatch is caused to be presented at a user interface.

20 Claims, 15 Drawing Sheets

(56) References Cited

U.S. PATENT DOCUMENTS

| | | | |
|---|---|---|---|
| 10,015,205 | B1 | 7/2018 | Cohen et al. |
| 10,097,974 | B1 * | 10/2018 | Ghoshal .................. H04W 4/60 |
| 10,305,758 | B1 | 5/2019 | Bhide et al. |
| 10,505,954 | B2 | 12/2019 | Stokes, III et al. |
| 10,516,695 | B1 | 12/2019 | Evans |
| 10,523,680 | B2 | 12/2019 | Turgeman et al. |
| 10,523,686 | B1 | 12/2019 | Mehta et al. |
| 10,673,880 | B1 | 6/2020 | Pratt et al. |
| 10,701,086 | B1 | 6/2020 | Mushtaq |
| 10,715,544 | B2 | 7/2020 | Gould et al. |
| 10,749,872 | B2 | 8/2020 | Zhao |
| 10,757,132 | B1 | 8/2020 | Powers et al. |
| 10,798,241 | B1 | 10/2020 | Quilici et al. |
| 11,019,101 | B2 | 5/2021 | Narayanaswamy et al. |
| 11,145,123 | B1 | 10/2021 | Chor et al. |
| 11,212,303 | B1 | 12/2021 | Shah |
| 11,245,722 | B1 | 2/2022 | Senecal et al. |
| 11,307,959 | B2 | 4/2022 | Hansmann et al. |
| 11,368,483 | B1 | 6/2022 | Senecal et al. |
| 11,374,945 | B1 | 6/2022 | Senecal et al. |
| 11,537,627 | B1 | 12/2022 | Baskaran et al. |
| 11,552,971 | B1 | 1/2023 | Karak et al. |
| 11,564,266 | B1 | 1/2023 | Kahn |
| 11,715,051 | B1 | 8/2023 | Baskaran et al. |
| 11,782,912 | B2 | 10/2023 | Wu et al. |
| 11,874,822 | B1 | 1/2024 | Singh et al. |
| 11,902,306 | B1 | 2/2024 | Satish |
| 11,966,820 | B2 | 4/2024 | Ghatage et al. |
| 12,008,222 | B1 | 6/2024 | Niv et al. |
| 12,010,127 | B1 | 6/2024 | Niv et al. |
| 12,021,888 | B1 | 6/2024 | Reed et al. |
| 12,026,137 | B1 * | 7/2024 | Sethi ...................... G06F 16/215 |
| 12,028,362 | B1 | 7/2024 | Cui et al. |
| 12,067,119 | B1 | 8/2024 | Brandwine |
| 12,088,609 | B1 | 9/2024 | Boteanu et al. |
| 12,235,969 | B2 | 2/2025 | Shakarian et al. |
| 12,244,627 | B2 | 3/2025 | Lidgi et al. |
| 12,261,887 | B2 | 3/2025 | McCaig et al. |
| 12,267,326 | B2 | 4/2025 | Lidgi et al. |
| 12,284,220 | B2 | 4/2025 | Reznik et al. |
| 12,341,797 | B1 | 6/2025 | Adamson et al. |
| 12,368,716 | B1 | 7/2025 | Goel et al. |
| 12,395,488 | B2 | 8/2025 | Lidgi et al. |
| 12,405,849 | B1 | 9/2025 | Reed et al. |
| 12,407,701 | B1 | 9/2025 | Varakantam et al. |
| 12,425,428 | B1 | 9/2025 | Sobrier et al. |
| 12,425,430 | B1 | 9/2025 | Reed et al. |
| 12,437,050 | B2 | 10/2025 | Nussbaum |
| 12,443,720 | B2 | 10/2025 | Lidgi et al. |
| 12,445,474 | B1 | 10/2025 | Reed et al. |
| 12,455,966 | B1 | 10/2025 | Lande Blau et al. |
| 12,462,254 | B2 | 11/2025 | Bansal et al. |
| 12,463,981 | B1 | 11/2025 | Ismirnioglou |
| 12,463,997 | B1 | 11/2025 | Guo et al. |
| 12,470,577 | B1 | 11/2025 | Patil et al. |
| 12,470,578 | B1 | 11/2025 | Patil et al. |
| 12,470,583 | B1 | 11/2025 | Ben Arzi et al. |
| 12,483,576 | B1 | 11/2025 | Guo et al. |
| 12,489,770 | B1 | 12/2025 | Fechner et al. |
| 12,500,910 | B1 | 12/2025 | Adamson et al. |
| 12,506,705 | B1 | 12/2025 | Wang et al. |
| 12,537,884 | B1 | 1/2026 | Hall et al. |
| 12,556,565 | B1 | 2/2026 | Saban |
| 12,563,060 | B1 | 2/2026 | Sobrier et al. |
| 12,568,144 | B2 | 3/2026 | Urmanov et al. |
| 2011/0185055 | A1 | 7/2011 | Nappier et al. |
| 2011/0247045 | A1 | 10/2011 | Rajagopal et al. |
| 2013/0086188 | A1 | 4/2013 | Mays et al. |
| 2013/0340028 | A1 | 12/2013 | Rajagopal et al. |
| 2014/0201126 | A1 | 7/2014 | Zadeh et al. |
| 2014/0331309 | A1 | 11/2014 | Spiers et al. |
| 2015/0012665 | A1 * | 1/2015 | Kang .................. H04L 61/2532 |
| | | | 709/245 |
| 2015/0058923 | A1 | 2/2015 | Rajagopal et al. |
| 2015/0172321 | A1 | 6/2015 | Kirti et al. |
| 2015/0188949 | A1 | 7/2015 | Mahaffey et al. |
| 2015/0281453 | A1 | 10/2015 | Maturana et al. |
| 2015/0319185 | A1 | 11/2015 | Kirti et al. |
| 2016/0050213 | A1 | 2/2016 | Storr |
| 2016/0105393 | A1 | 4/2016 | Thakkar et al. |
| 2016/0330236 | A1 | 11/2016 | Reddy et al. |
| 2017/0104636 | A1 | 4/2017 | Vora et al. |
| 2017/0118239 | A1 | 4/2017 | Most et al. |
| 2017/0155652 | A1 | 6/2017 | Most et al. |
| 2017/0251013 | A1 | 8/2017 | Kirti et al. |
| 2018/0027006 | A1 | 1/2018 | Zimmermann et al. |
| 2018/0204111 | A1 | 7/2018 | Zadeh et al. |
| 2018/0288045 | A1 | 10/2018 | Karunakaran et al. |
| 2018/0359237 | A1 | 12/2018 | Shem Tov et al. |
| 2018/0375886 | A1 | 12/2018 | Kirti et al. |
| 2019/0068627 | A1 | 2/2019 | Thampy |
| 2019/0081968 | A1 | 3/2019 | Wang et al. |
| 2019/0095320 | A1 | 3/2019 | Biswas et al. |
| 2019/0098037 | A1 | 3/2019 | Shenoy, Jr. et al. |
| 2019/0138638 | A1 | 5/2019 | Pal et al. |
| 2019/0138639 | A1 | 5/2019 | Pal et al. |
| 2019/0138640 | A1 | 5/2019 | Pal et al. |
| 2019/0138641 | A1 | 5/2019 | Pal et al. |
| 2019/0138642 | A1 | 5/2019 | Pal et al. |
| 2019/0147084 | A1 | 5/2019 | Pal et al. |
| 2019/0147085 | A1 | 5/2019 | Pal et al. |
| 2019/0147086 | A1 | 5/2019 | Pal et al. |
| 2019/0147092 | A1 | 5/2019 | Pal et al. |
| 2019/0190950 | A1 | 6/2019 | Senecal et al. |
| 2019/0220863 | A1 | 7/2019 | Novick et al. |
| 2019/0258632 | A1 | 8/2019 | Pal et al. |
| 2019/0258635 | A1 | 8/2019 | Pal et al. |
| 2019/0258636 | A1 | 8/2019 | Bhattacharjee et al. |
| 2019/0258637 | A1 | 8/2019 | Bhattacharjee et al. |
| 2019/0272271 | A1 | 9/2019 | Bhattacharjee et al. |
| 2019/0310977 | A1 | 10/2019 | Pal et al. |
| 2019/0318100 | A1 | 10/2019 | Bhatia et al. |
| 2019/0318122 | A1 | 10/2019 | Hockey et al. |
| 2019/0349332 | A1 | 11/2019 | Murthy |
| 2019/0364492 | A1 | 11/2019 | Azizi et al. |
| 2020/0050586 | A1 | 2/2020 | Pal et al. |
| 2020/0050607 | A1 | 2/2020 | Pal et al. |
| 2020/0050612 | A1 | 2/2020 | Bhattacharjee et al. |
| 2020/0065303 | A1 | 2/2020 | Bhattacharjee et al. |
| 2020/0128047 | A1 | 4/2020 | Biswas et al. |
| 2020/0167175 | A1 * | 5/2020 | Tsirkin ................ H04L 61/2514 |
| 2020/0177598 | A1 | 6/2020 | Storr |
| 2020/0184278 | A1 | 6/2020 | Zadeh et al. |
| 2020/0186544 | A1 | 6/2020 | Dichiu et al. |
| 2020/0186545 | A1 | 6/2020 | Dichiu et al. |
| 2020/0186546 | A1 | 6/2020 | Dichiu et al. |
| 2020/0273040 | A1 | 8/2020 | Novick et al. |
| 2020/0296117 | A1 | 9/2020 | Karpovsky et al. |
| 2020/0327221 | A1 | 10/2020 | Street |
| 2020/0364223 | A1 | 11/2020 | Pal et al. |
| 2020/0404573 | A1 | 12/2020 | Athlur et al. |
| 2020/0410820 | A1 | 12/2020 | Ellis et al. |
| 2021/0027458 | A1 | 1/2021 | Chor et al. |
| 2021/0028991 | A1 | 1/2021 | Nataraj |
| 2021/0084073 | A1 | 3/2021 | Crabtree et al. |
| 2021/0117425 | A1 | 4/2021 | Rao et al. |
| 2021/0117515 | A1 | 4/2021 | Bartfai-Walcott et al. |
| 2021/0168150 | A1 | 6/2021 | Ross et al. |
| 2021/0232542 | A1 | 7/2021 | Dhanabalan et al. |
| 2021/0232673 | A1 | 7/2021 | Athlur et al. |
| 2021/0243208 | A1 | 8/2021 | Rubin et al. |
| 2021/0243212 | A1 | 8/2021 | Bowman et al. |
| 2021/0352064 | A1 | 11/2021 | Tsarfati et al. |
| 2021/0390486 | A1 | 12/2021 | Chu et al. |
| 2022/0012134 | A1 | 1/2022 | Chatterjee et al. |
| 2022/0070095 | A1 * | 3/2022 | Wu ......................... H04L 45/74 |
| 2022/0091947 | A1 | 3/2022 | Kothari et al. |
| 2022/0121884 | A1 | 4/2022 | Zadeh et al. |
| 2022/0156396 | A1 | 5/2022 | Bednash et al. |
| 2022/0279023 | A1 | 9/2022 | Solari et al. |
| 2022/0286854 | A1 | 9/2022 | Howe et al. |
| 2022/0286894 | A1 | 9/2022 | Howe et al. |
| 2022/0286912 | A1 | 9/2022 | Howe et al. |
| 2022/0321533 | A1 | 10/2022 | Zheng |

(56) References Cited

U.S. PATENT DOCUMENTS

| | | | |
|---|---|---|---|
| 2022/0342993 | A1 | 10/2022 | Shear et al. |
| 2022/0385656 | A1 | 12/2022 | Gujarathi |
| 2022/0405775 | A1 | 12/2022 | Siebel et al. |
| 2022/0408255 | A1 | 12/2022 | Howe |
| 2023/0015603 | A1 | 1/2023 | Smith |
| 2023/0019448 | A1 | 1/2023 | Deshmukh et al. |
| 2023/0107335 | A1 | 4/2023 | Garyani et al. |
| 2023/0113332 | A1 | 4/2023 | Crabtree et al. |
| 2023/0114727 | A1 | 4/2023 | Ellis et al. |
| 2023/0114821 | A1 | 4/2023 | Thomas et al. |
| 2023/0195863 | A1 | 6/2023 | Xu et al. |
| 2023/0199025 | A1 | 6/2023 | Xu et al. |
| 2023/0205734 | A1 | 6/2023 | Zhang et al. |
| 2023/0208855 | A1 | 6/2023 | Sheriff et al. |
| 2023/0231884 | A1 | 7/2023 | Deshmukh et al. |
| 2023/0247003 | A1 | 8/2023 | Chanak et al. |
| 2023/0315418 | A1 | 10/2023 | Bokhan-Dilawari et al. |
| 2023/0315428 | A1 | 10/2023 | Hendrey et al. |
| 2023/0315580 | A1 | 10/2023 | Hendrey |
| 2023/0315842 | A1 | 10/2023 | dos Santos Silva et al. |
| 2023/0318911 | A1 | 10/2023 | Hendrey et al. |
| 2023/0318935 | A1 | 10/2023 | Sergeev et al. |
| 2023/0319054 | A1 | 10/2023 | Hendrey et al. |
| 2023/0319086 | A1 | 10/2023 | Beauchesne et al. |
| 2023/0344845 | A1 | 10/2023 | Cady |
| 2023/0367833 | A1 | 11/2023 | Kol et al. |
| 2023/0370321 | A1* | 11/2023 | Perez .................. G06F 11/3428 |
| 2023/0420147 | A1 | 12/2023 | Baker et al. |
| 2024/0012932 | A1 | 1/2024 | Qiao et al. |
| 2024/0022546 | A1 | 1/2024 | Crabtree et al. |
| 2024/0031455 | A1 | 1/2024 | Nadendla et al. |
| 2024/0045964 | A1 | 2/2024 | Bednash et al. |
| 2024/0106826 | A1 | 3/2024 | Ravichandran et al. |
| 2024/0107122 | A1 | 3/2024 | Akhoury et al. |
| 2024/0121211 | A1 | 4/2024 | Bhatia et al. |
| 2024/0146745 | A1 | 5/2024 | Lidgi et al. |
| 2024/0146747 | A1 | 5/2024 | Zaytsev et al. |
| 2024/0163261 | A1 | 5/2024 | Crabtree et al. |
| 2024/0267783 | A1 | 8/2024 | Howe |
| 2024/0320231 | A1 | 9/2024 | Bhattacharjee et al. |
| 2024/0364712 | A1 | 10/2024 | Chandana et al. |
| 2024/0364747 | A1 | 10/2024 | Gilburd et al. |
| 2024/0365118 | A1 | 10/2024 | Nainar et al. |
| 2024/0372880 | A1 | 11/2024 | Bansal et al. |
| 2025/0007988 | A1* | 1/2025 | Letort .................... H04W 4/60 |
| 2025/0030712 | A1 | 1/2025 | Saraf et al. |
| 2025/0039196 | A1 | 1/2025 | Crabtree et al. |
| 2025/0063063 | A1 | 2/2025 | Tishbi et al. |
| 2025/0077255 | A1 | 3/2025 | Abidi et al. |
| 2025/0094575 | A1 | 3/2025 | Lashgari et al. |
| 2025/0130910 | A1 | 4/2025 | Meyuhas |
| 2025/0133120 | A1 | 4/2025 | Valek et al. |
| 2025/0158989 | A1 | 5/2025 | Howe |
| 2025/0158990 | A1 | 5/2025 | Howe |
| 2025/0159022 | A1 | 5/2025 | Howe |
| 2025/0159023 | A1 | 5/2025 | Howe |
| 2025/0190966 | A1 | 6/2025 | Gutierrez-Sheris |
| 2025/0233884 | A1 | 7/2025 | Sherr Lurie et al. |
| 2025/0247252 | A1 | 7/2025 | Honji |
| 2025/0265585 | A1 | 8/2025 | Bansal et al. |
| 2025/0272681 | A1 | 8/2025 | Bansal et al. |
| 2025/0274469 | A1 | 8/2025 | Bar On et al. |
| 2025/0298792 | A1 | 9/2025 | Tongaonkar et al. |
| 2025/0317419 | A1 | 10/2025 | Narayanaswamy et al. |
| 2025/0317826 | A1 | 10/2025 | Howe et al. |
| 2025/0343690 | A1 | 11/2025 | Pergament et al. |
| 2025/0358337 | A1 | 11/2025 | Urmanov et al. |
| 2025/0358702 | A1 | 11/2025 | Anghel et al. |
| 2025/0363085 | A1 | 11/2025 | Tishbi et al. |
| 2025/0373630 | A1 | 12/2025 | Adamson et al. |
| 2025/0373642 | A1 | 12/2025 | Edwards et al. |
| 2025/0373647 | A1 | 12/2025 | Bazak et al. |
| 2025/0373673 | A1 | 12/2025 | Sheppard et al. |
| 2025/0392483 | A1 | 12/2025 | Fiebrink et al. |
| 2026/0012455 | A1 | 1/2026 | Swaminathan |
| 2026/0023859 | A1 | 1/2026 | Lowther et al. |
| 2026/0032161 | A1 | 1/2026 | Sheppard et al. |

OTHER PUBLICATIONS logrhythm.com, "V 2.0 Correlated Event Messages" https://docs. logrhythm.com/devices/docs/v-2-0-correlated-event-messages.

Mao, Ziqing, "Improving real-world access control systems by identifying the true origins of a request", Purdue University, https://docs.lib.purdue.edu/dissertations/AAI3403124/.

Siglani, A. et al. "Correlating security events across different log sources" Jul. 13, 2023, https://opensearch.org/blog/correlating-security-events/.

U.S. Appl. No. 19/423,759, filed Dec. 17, 2025, and titled "Systems and Methods for Authenticating a Request to Access a Resource in a Cloud System".

Varshini, "Advanced Log Correlation Techniques for Real-Time Threat Detection", Apr. 17, 2025, https://gbhackers.com/advanced-log-correlation-techniques-for-real-time-threat-detection/.

Non-Final Office Action for U.S. Appl. No. 18/895,089 notified Mar. 12, 2026.

Ott et al., "Robust and Transferable Anomaly Detection in Log Data using Pre-Trained Language Models," IEEE, pp. 19-24 (Year: 2021).

Vervaet, "MoniLog an Automated Log-Based Anomaly Detection System for Cloud Computing Infrastructures", pp. 1-5 (Year: 2023).

* cited by examiner

Figure 4:
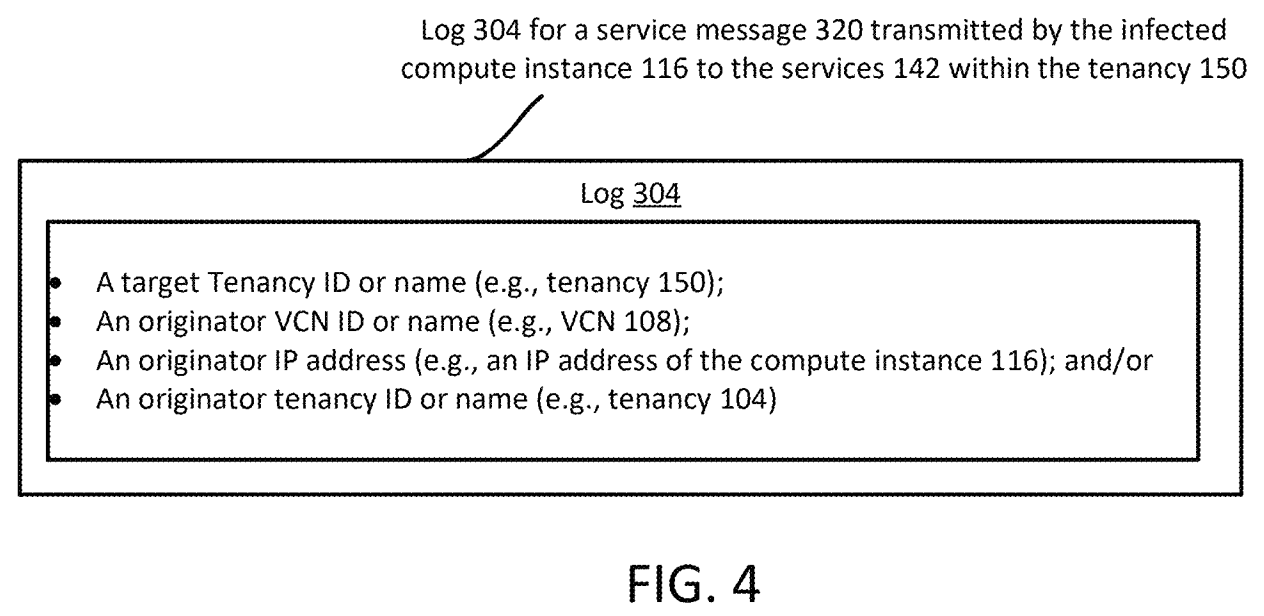

Log 304 for a service message 320 transmitted by the infected compute instance 116 to the services 142 within the tenancy 150

Log 304

- A target Tenancy ID or name (e.g., tenancy 150);
- An originator VCN ID or name (e.g., VCN 108);
- An originator IP address (e.g., an IP address of the compute instance 116); and/or
- An originator tenancy ID or name (e.g., tenancy 104)

Inventory database 308

VCN to tenancy mapping 504

| VCN Name/ID | Tenancy Name/ID |
|---|---|
| VCN 108 | Tenancy 104 |
| VCN 158 | Tenancy 150 |
| VCN VA | Tenancy TA |
| VCN VB | Tenancy TA |
| ⋮ | ⋮ |
| VCN VZ | Tenancy TZ |

IP address to VCN mapping 508

| IP address | VCN Name/ID |
|---|---|
| IP.AAA | VCN 108 |
| IP.BBB | VCN 108 |
| IP.CCC | VCN 158 |
| IP.DDD | VCN VA |
| ⋮ | ⋮ |
| IP.ZZZ | VCN VZ |

FIG. 6

Inventory database 308a

VCN to tenancy and IP address mapping 512

| VCN Name/ID | Tenancy Name/ID | IP addresses |
|---|---|---|
| VCN 108 | Tenancy 104 | IP.AAA, IP.BBB |
| VCN 158 | Tenancy 150 | IP.CCC |
| VCN VA | Tenancy TA | IP.AAB |
| VCN VB | Tenancy TA | IP.AAC, IP.AAPm IP.AAn |
| ⋮ | ⋮ | ⋮ |
| VCN VZ | Tenancy TZ | IP.ZZZ |

Figure 7:
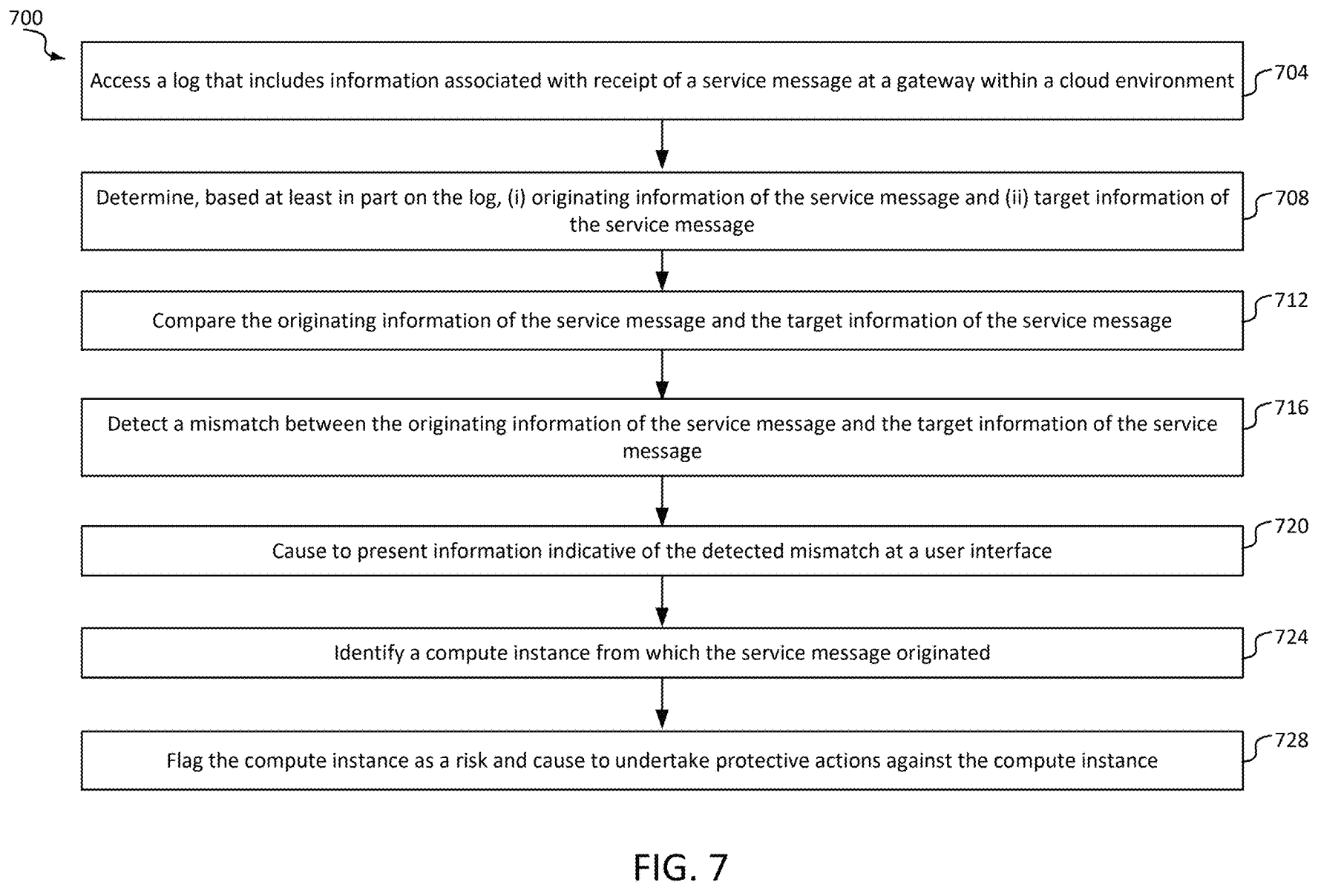

700

704
Access a log that includes information associated with receipt of a service message at a gateway within a cloud environment 708
Determine, based at least in part on the log, (i) originating information of the service message and (ii) target information of the service message 712
Compare the originating information of the service message and the target information of the service message 716
Detect a mismatch between the originating information of the service message and the target information of the service message 720
Cause to present information indicative of the detected mismatch at a user interface 724
Identify a compute instance from which the service message originated 728
Flag the compute instance as a risk and cause to undertake protective actions against the compute instance

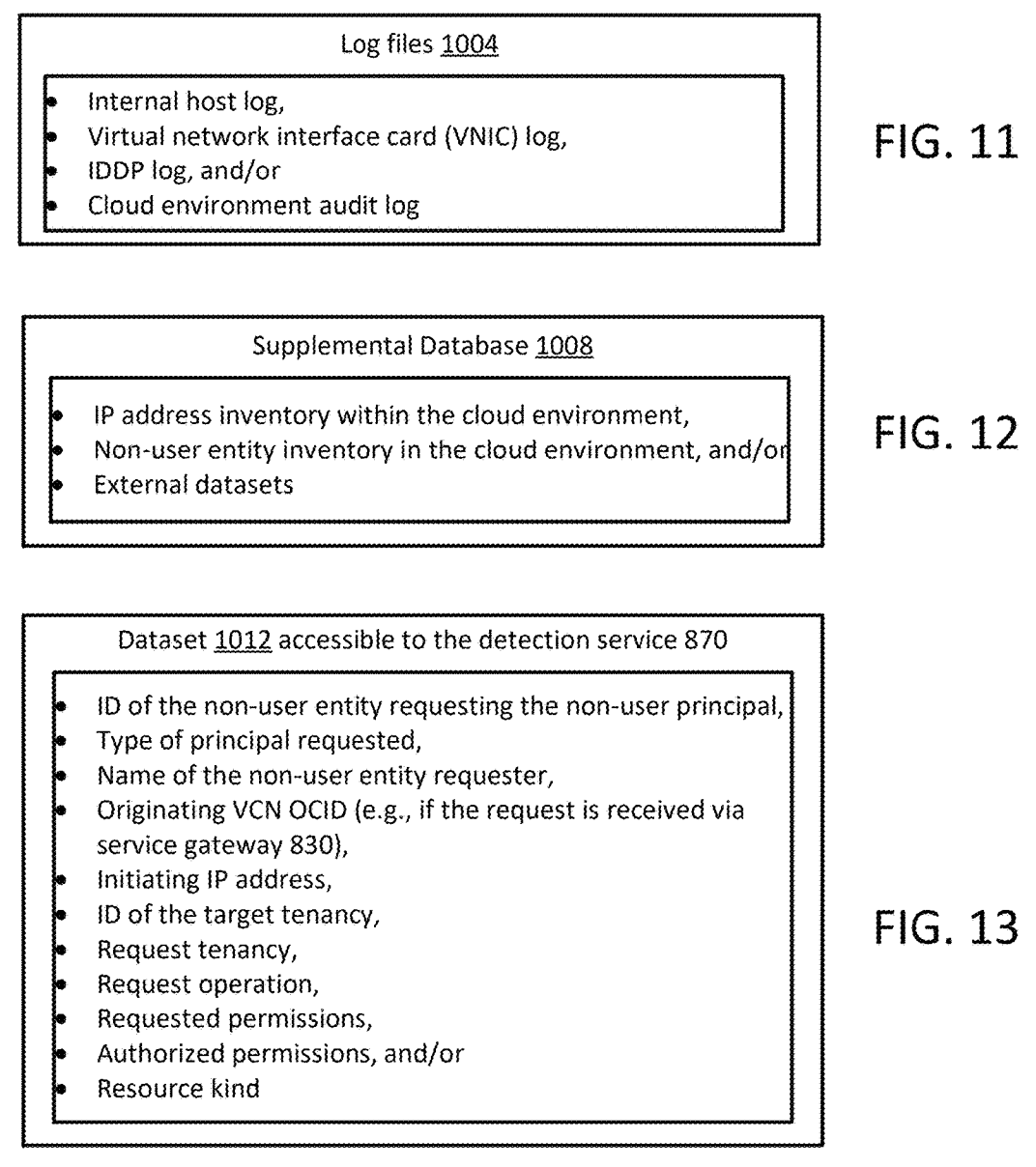

Log files 1004

- Internal host log,
- Virtual network interface card (VNIC) log,
- IDDP log, and/or
- Cloud environment audit log

FIG. 12

Supplemental Database 1008

- IP address inventory within the cloud environment,
- Non-user entity inventory in the cloud environment, and/or
- External datasets

FIG. 13

Dataset 1012 accessible to the detection service 870

- ID of the non-user entity requesting the non-user principal,
- Type of principal requested,
- Name of the non-user entity requester,
- Originating VCN OCID (e.g., if the request is received via service gateway 830),
- Initiating IP address,
- ID of the target tenancy,
- Request tenancy,
- Request operation,
- Requested permissions,
- Authorized permissions, and/or
- Resource kind

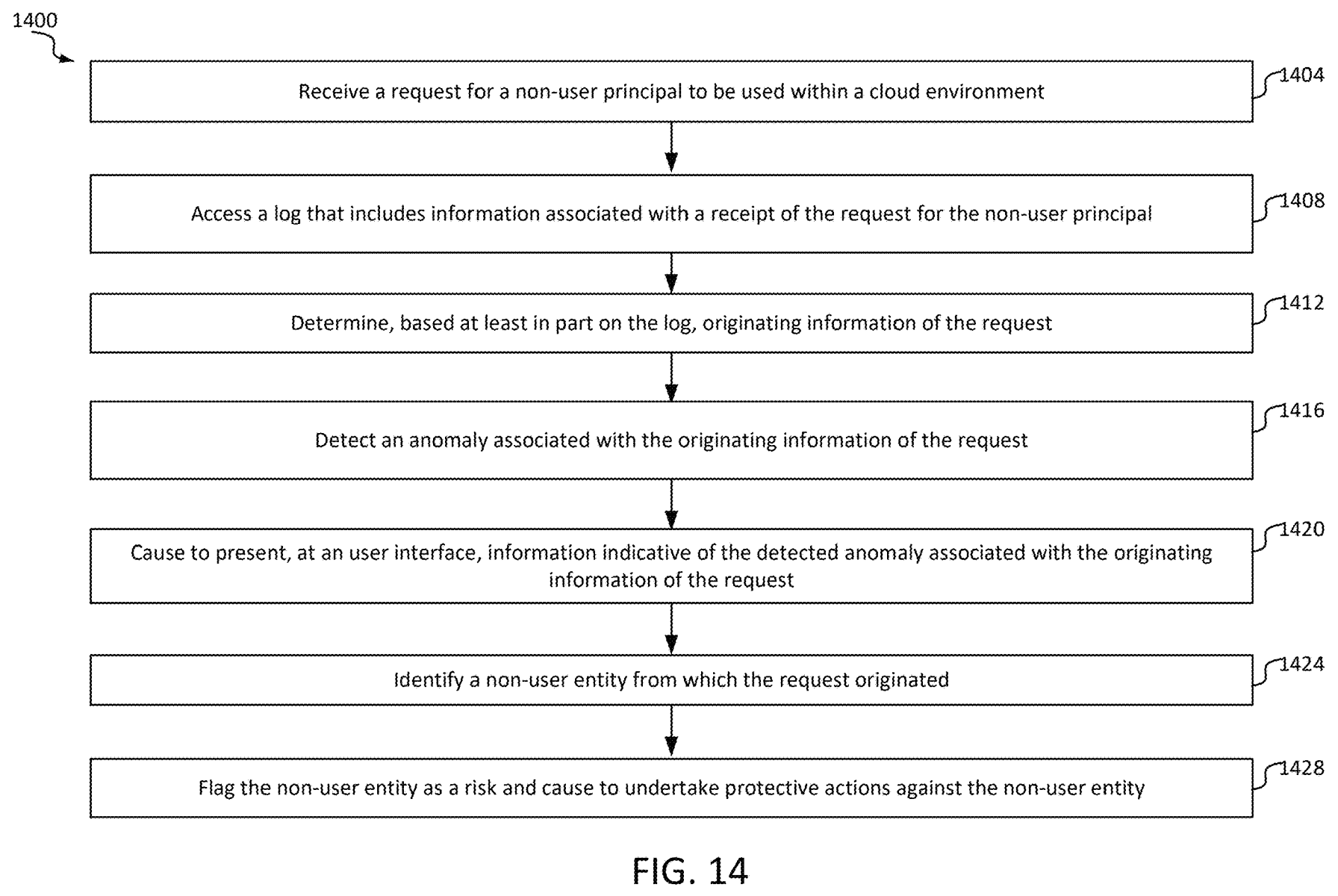

1400

1404   Receive a request for a non-user principal to be used within a cloud environment 1408   Access a log that includes information associated with a receipt of the request for the non-user principal 1412   Determine, based at least in part on the log, originating information of the request 1416   Detect an anomaly associated with the originating information of the request 1420   Cause to present, at an user interface, information indicative of the detected anomaly associated with the originating information of the request 1424   Identify a non-user entity from which the request originated 1428   Flag the non-user entity as a risk and cause to undertake protective actions against the non-user entity

FIG. 14

DETECTING INTER-TENANCY EXFILTRATION IN A CLOUD ENVIRONMENT

CROSS REFERENCE TO RELATED APPLICATIONS

The present application is related to U.S. patent application Ser. No. 18/895,089, filed Sep. 24, 2024, entitled "DETECTING STEALING OF PRINCIPALS IN A CLOUD ENVIRONMENT," filed on even date herewith, which are hereby incorporated by reference in their entirety for all purposes.

BACKGROUND

A cloud provider provides on-demand, scalable computing resources of a cloud environment to its cloud customers. A cloud customer generally desires to run its cloud resources without monitoring, scanning, or other interference by the cloud provider or other cloud customers. Therefore, the cloud provider offers "tenancies" to its cloud customers. A tenancy is an isolated partition within the cloud environment, such that resources in different tenancies are isolated from each other unless explicitly shared. Each tenancy runs a plurality of virtual machine compute instances.

BRIEF SUMMARY

In some embodiments, a non-transitory computer-readable medium includes instructions that when executed by one or more processors, cause a system including the one or more processors to perform operations including: accessing a log that includes information associated with receipt of a service message at a gateway within a cloud environment; determining, based at least in part on the log, (i) originating information of the service message and (ii) target information of the service message; comparing the originating information of the service message and the target information of the service message; detecting a mismatch between the originating information of the service message and the target information of the service message; and in response to the detected mismatch between the originating information of the service message and the target information of the service message, causing to present information indicative of the detected mismatch at a user interface. In an example, the operation further comprises identifying a compute instance from which the service message originated; and in response to the detected mismatch, (i) flagging the compute instance as a risk and (ii) causing to undertake protective actions against the compute instance. In an example, the originating information of the service message identifies an originating tenancy of the service message; the target information of the service message identifies a target tenancy of the service message; and detecting the mismatch comprises detecting a mismatch between the originating tenancy and target tenancy. In an example, determining the originating information of the service message comprises determining, from the log, an identification of a virtual cloud network (VCN) from which the service message originated; and mapping the identification of the VCN from which the service message originated to a tenancy, wherein the originating information of the service message identifies the tenancy.

In an example, determining the originating information of the service message comprises determining, from the log, an Internet Protocol (IP) address from which the service message originated; and mapping the IP address from which the service message originated to a tenancy, wherein the originating information of the service message identifies the tenancy. In an example, wherein mapping the IP address from which the service message originated to the tenancy comprises mapping the IP address from which the service message originated to an identification of a virtual cloud network (VCN); and mapping the identification of the VCN to the tenancy including the VCN. In an example, determining, from the log, the originating information of the service message comprises determining an identification of a compute instance from which the service message originated; and mapping the identification of the compute instance to a tenancy that includes the compute instance, wherein the originating information of the service message identifies the tenancy. In an example, the operation further comprises at least one of (i) determining, from the log, a first tenancy from which the service message originated, wherein the originating information of the service message identifies the first tenancy; and (i) determining, from the log, a second tenancy that is a target of the service message, wherein the target information of the service message identifies the second tenancy.

In an example, the gateway is a service gateway of the cloud environment. In an example, the originating information of the service message identifies an originating tenancy of the service message, wherein the target information of the service message identifies a target tenancy of the service message, and wherein the operation further comprises gathering, by a compute instance within the originating tenancy, data from one or more cloud resources within the originating tenancy; generating, by the compute instance within the originating tenancy, the service message including the data; and attempting to transmit, by the compute instance within the originating tenancy, the service message to the target tenancy via the gateway. In an example, the operation further comprises in response to the detected mismatch between the originating information of the service message and the target information of the service message, blocking a passage of the service message from the gateway to a target of the service message. In an example, the operation further comprises transmitting, by a first compute instance, the service message to a target and via the gateway, using an instance principal that is assigned to a second compute instance different from the first compute instance, wherein the first compute instance is within a first tenancy of the cloud environment, and the second compute instance is within a second tenancy of the cloud environment, the second tenancy different from the first tenancy. In an example, the instance principal is stolen from the second compute instance and loaded to the first compute instance. In an example, the first compute instance and the second compute instance are within a first tenancy and a second tenancy, respectively, of a same cloud region of the cloud environment.

In some embodiments, a method comprises accessing a log that includes information associated with receipt of a service message at a gateway within a cloud environment; determining, based at least in part on the log, (i) originating information of the service message and (ii) target information of the service message; comparing the originating information of the service message and the target information of the service message; detecting a mismatch between the originating information of the service message and the target information of the service message; and in response to the detected mismatch between the originating information of the service message and the target information of the service message, presenting information indicative of the detected mismatch at a user interface. In an example, the originating information of the service message identifies an originating tenancy of the service message; the target information of the service message identifies a target tenancy of the service message; and detecting the mismatch comprises detecting a mismatch between the originating tenancy and target tenancy. In an example, determining the originating information of the service message comprises determining, from the log, an identification of a virtual cloud network (VCN) or an Internet Protocol address from which the service message originated; and mapping the identification of the VCN or the Internet Protocol address from which the service message originated to a tenancy, wherein the originating information of the service message identifies the tenancy. In an example, the method further comprises transmitting, by a first compute instance, the service message to a target and via the gateway, using an instance principal that is assigned to a second compute instance different from the first compute instance, wherein the first compute instance is within a first tenancy of the cloud environment, and the second compute instance is within a second tenancy of the cloud environment, the second tenancy different from the first tenancy.

In some embodiments, a system comprises one or more processors; and one or more non-transitory computer-readable media storing instructions, which, when executed by the system, cause the system to perform a set of actions including: accessing a log that includes information associated with receipt of a service message at a gateway within a cloud environment; determining, based at least in part on the log, (i) originating information of the service message and (ii) target information of the service message; comparing the originating information of the service message and the target information of the service message; detecting a mismatch between the originating information of the service message and the target information of the service message; and in response to the detected mismatch between the originating information of the service message and the target information of the service message, presenting information indicative of the detected mismatch at a user interface. In an example, the gateway is a service gateway of the cloud environment.

In some embodiments, a non-transitory computer-readable medium includes instructions that when executed by one or more processors, cause a system including the one or more processors to perform operations including receiving a request for a non-user principal to be used within a cloud environment; accessing a log that includes information associated with a receipt of the request for the non-user principal; determining, based at least in part on the log, originating information of the request; detecting an anomaly associated with the originating information of the request; and in response to detecting the anomaly associated with the originating information of the request, causing to present, at a user interface, information indicative of the detected anomaly associated with the originating information of the request. In an example, the operation further comprises in response to detecting the anomaly associated with the originating information of the request, rescinding the non-user principal granted based on the request. In an example, the operation further comprises in response to detecting the anomaly associated with the originating information of the request, blocking the request, such that no non-user principal is granted based on the request. In an example, the operation further comprises identifying a non-user entity from which the request originated; and in response to detecting the anomaly associated with the originating information of the request, (i) flagging the non-user entity from which the request originated as a risk and (ii) causing to undertake protective actions against the non-user entity from which the request originated. In an example, detecting the anomaly associated with the originating information of the request comprises detecting that the originating information includes an identification of an Internet Protocol (IP) address from which the request originated; mapping the IP address to outside the cloud environment; and in response to mapping the IP address to outside the cloud environment, detecting the anomaly associated with the originating information of the request.

In an example, detecting the anomaly associated with the originating information of the request comprises detecting that the originating information includes an identification of an Internet Protocol (IP) address from which the request originated; mapping the IP address to outside the cloud environment; accessing a safe list of IP addresses outside the cloud environment; determining that the IP address, from which the request was transmitted, is not within the safe list of IP addresses outside the cloud environment; and in response to (i) mapping the IP address to outside the cloud environment and (ii) determining that the IP address is not within the safe list of IP addresses, detecting the anomaly associated with the originating information of the request. In an example, the request for the non-user principal originates from a requesting non-user entity, and wherein detecting the anomaly associated with the originating information of the request comprises receiving, along with or as a part of the request for the non-user principal, credentials assigned to an original non-user entity; detecting that the originating information includes an identification of an Internet Protocol (IP) address from which the request originated; mapping the IP address to a first tenancy of the cloud environment; determining that the original non-user entity, to which the credentials were assigned, is located within a second tenancy of the cloud environment that is different from the first tenancy; and in response to determining that the original non-user entity is located within the second tenancy that is different from the first tenancy, detecting the anomaly associated with the originating information of the request. In an example, mapping the IP address to the first tenancy of the cloud environment comprises accessing a database that identifies, for each of a plurality of tenancies of the cloud environment, a corresponding plurality of IP addresses assigned to the corresponding tenancy; and mapping the IP address to the first tenancy of the cloud environment, based at least in part on accessing the database. In an example, the IP address is a private IP address, and wherein mapping the IP address to the first tenancy of the cloud environment comprises mapping the private IP address to a gateway of the first tenancy of the cloud environment. In an example, the IP address is a public IP address, and wherein mapping the IP address to the first tenancy of the cloud environment comprises mapping the public IP address to a compute instance, or a cloud resource, or a cloud service; determining that the compute instance, or the cloud resource, or the cloud service is within the first tenancy of the cloud environment; and in response to determining that the compute instance, or the cloud resource, or the cloud service is within the first tenancy of the cloud environment, mapping the IP address to the first tenancy of the cloud environment. In an example, detecting the anomaly associated with the originating information of the request comprises detecting that the originating information is indicative of a first tenancy form which the request originated; determining that an original non-user entity of the cloud environment is located within a second tenancy of the cloud environment that is different from the first tenancy; and in response to determining that the original non-user entity is located within the second tenancy that is different from the first tenancy, detecting the anomaly associated with the originating information of the request, wherein determining that the original non-user entity of the cloud environment is located within the second tenancy comprises accessing a key or a certificate accompanying the request; identifying the original non-user entity of the cloud environment to whom the key or the certificate was issued; and determining that the identified original non-user entity of the cloud environment is within the second tenancy of the cloud environment.

In an example, detecting the anomaly associated with the originating information of the request comprises determining that the originating information is indicative of a first virtual cloud network (VCN) form which the request originated; determining that an original non-user entity of the cloud environment is located within a second VCN of the cloud environment that is different from the first VCN, wherein credentials originally assigned to the original non-user entity accompanies the request or is a part of the request; and in response to determining that original the non-user entity of the cloud environment is located within the second VCN of the cloud environment that is different from the first VCN, detecting the anomaly associated with the originating information of the request. In an example, detecting the anomaly associated with the originating information of the request comprises identifying an operation for which the non-user principal is to be used by a non-user entity from which the request is received; determining that the operation is outside a set of operations permitted for the non-user from which the request is received; and in response to determining that the operation is outside a set of operations permitted for the non-user entity from which the request is received, detecting the anomaly associated with the originating information of the request. In an example, the non-user principal is one of an instance principal, a resource principal, or a service principal to be assigned to a compute instance, a cloud resource, or a service, respectively, of the cloud environment.

In some embodiments, a method comprises receiving a request for a non-user principal to be used within a cloud environment; accessing a log that includes information associated with a receipt of the request for the non-user principal; determining, based at least in part on the log, originating information of the request; detecting an anomaly associated with the originating information of the request; and in response to detecting the anomaly associated with the originating information of the request, causing to present information indicative of the detected anomaly associated with the originating information of the request. In an example, detecting the anomaly associated with the originating information of the request comprises detecting that the originating information includes an identification of an Internet Protocol (IP) address from which the request originated; mapping the IP address to outside the cloud environment; accessing a safe list of IP addresses outside the cloud environment; determining that the IP address, from which the request was transmitted, is not within the safe list of IP addresses outside the cloud environment; and in response to (i) mapping the IP address to outside the cloud environment and (ii) determining that the IP address is not within the safe list of IP addresses, detecting the anomaly associated with the originating information of the request. In an example, the request for the non-user principal originates from a requesting non-user entity, and wherein detecting the anomaly associated with the originating information of the request comprises receiving, along with or as a part of the request for the non-user principal, credentials assigned to an original non-user entity; detecting that the originating information includes an identification of an Internet Protocol (IP) address from which the request originated; mapping the IP address to a first tenancy of the cloud environment; determining that the original non-user entity, to which the credentials were assigned, is located within a second tenancy of the cloud environment that is different from the first tenancy; and in response to determining that the original non-user entity is located within the second tenancy that is different from the first tenancy, detecting the anomaly associated with the originating information of the request. In an example, detecting the anomaly associated with the originating information of the request comprises determining that the originating information is indicative of a first virtual cloud network (VCN) form which the request originated; determining that an original non-user entity of the cloud environment is located within a second VCN of the cloud environment that is different from the first VCN, wherein credentials originally assigned to the original non-user entity accompanies the request or is a part of the request; and in response to determining that original the non-user entity of the cloud environment is located within the second VCN of the cloud environment that is different from the first VCN, detecting the anomaly associated with the originating information of the request.

In some embodiments, a system comprises one or more processors; and one or more non-transitory computer-readable media storing instructions, which, when executed by the system, cause the system to perform a set of actions including: receiving a request for a non-user principal to be used within a cloud environment; accessing a log that includes information associated with a receipt of the request for the non-user principal; determining, based at least in part on the log, originating information of the request; detecting an anomaly associated with the originating information of the request; and in response to detecting the anomaly associated with the originating information of the request, causing to present information indicative of the detected anomaly associated with the originating information of the request. In an example, detecting an anomaly associated with the originating information of the request comprises determining that the originating information is indicative of a first attribute of a requesting entity from which the request originated; determining a second attribute of an original entity to which credentials, which accompanies the request, were assigned; determining a mismatch between the first attribute and the second attribute; and in response to determining the mismatch between the first attribute and the second attribute, detecting the anomaly associated with the originating information of the request.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain an expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 4 illustrates a log including example log entries, where the log is generated based receipt of a service message by, for example, a service gateway, or an Identity Data Plane (IDDP) of a cloud environment.

FIG. 5 illustrates an inventory database mapping various cloud resources of a cloud environment.

FIG. 6 illustrates another inventory database mapping various cloud resources of a cloud environment.

FIG. 7 illustrates a flow diagram depicting a method for detecting inter-tenancy exfiltration of data within a cloud environment.

FIG. 11 illustrates example contents of log files that are accessible to a detection service of a cloud environment, where the detection service is configured to detect stealing of non-user principals within the cloud environment.

FIG. 12 illustrates example entries of a supplemental database that is accessible to a detection service of a cloud environment, where the detection service is configured to detect stealing of non-user principals within the cloud environment.

FIG. 13 illustrates example entries of a dataset accessible to a detection service of a cloud environment, where the detection service is configured to detect stealing of non-user principals within the cloud environment.

FIG. 14 illustrates a flow diagram depicting a method for detecting attempts to steal a non-user principal within a cloud environment.

DETAILED DESCRIPTION

Figure 1:
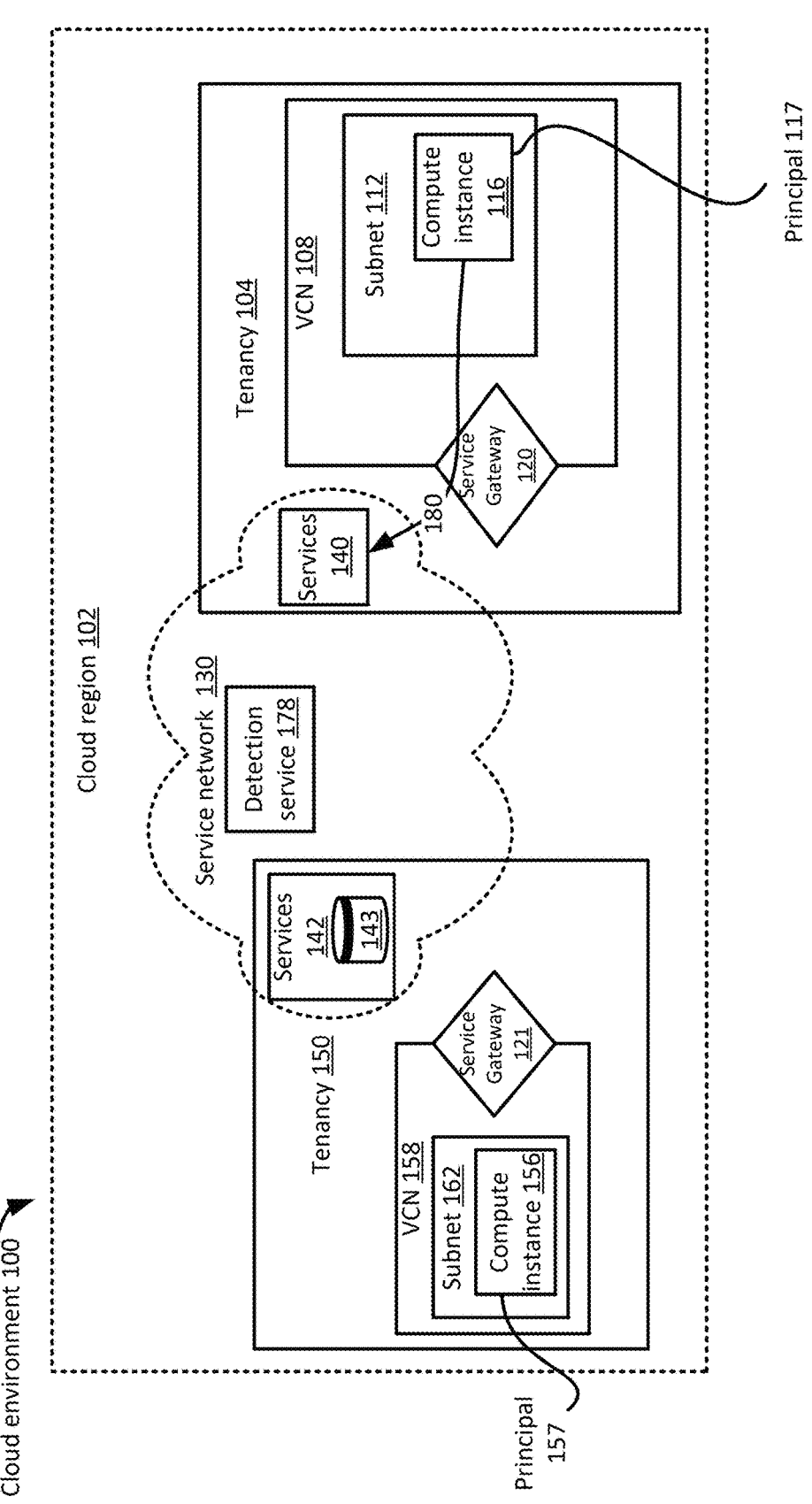
FIG. 1 illustrates a block diagram of a cloud environment that includes a detection service for detection of inter-tenancy exfiltration of data.

Maintaining security of a cloud environment involves controlling access to cloud resources based on permissions specified by respective cloud customers. A cloud customer can grant permissions for accessing cloud resources that it rents, but the cloud customer should not be able to grant permissions for accessing cloud resources rented by other customers. A tenancy is a conceptual bucket that holds cloud resources belonging to a particular cloud customer. An administrator of a tenancy has administrative rights to set access policies for cloud resources in the tenancy; an administrator of a tenancy does not have administrative rights to set access policies for cloud resources in another tenancy. A tenancy of a cloud customer is isolated from another tenancy of another cloud customer. A tenancy of a cloud customer includes a plurality of active cloud resources, such as compute instances that are used to host virtual machines. The cloud provider may also have control on one or more tenancies (e.g., cloud provider tenancies), through which the cloud provider may provide one or more services to the cloud customers. Transmission of data from one tenancy to another, unless there is a specific and legitimate need, is not permitted.

Identity and Access Management (IAM) within a cloud environment provides, among other things, authentication and authorization to control access to cloud resources in a cloud environment. Authentication involves verifying that a requester's claims about itself are true. Successful authentication results in granting an identity, also referred to as a "principal," to the requester. A principal may be granted initially to the requester, and may be periodically or intermittently refreshed. For example, an instance principle is an identity assigned to a compute instance operating within a tenancy. The instance principle can be configured to be assigned to a dynamic group, and policies can be assigned to the dynamic group, which then dictates various permissions associated with the instance. An identity associated with an instance principal is manifested as a session token granted by the IAM to the compute instance. Authorization involves verifying that a requester with a certain identity, as evidenced by presentation of the session token, has permission to access a cloud resource. Successful authorization results in permitting the requested access to the requested cloud resource.

Within a tenancy, a Virtual Cloud Network (VCN) is a customer-managed virtual, private network. A VCN covers one or more classless inter-domain routing (CIDR) blocks. Cloud resources within the VCN can communicate with each other through a private network path using IP addresses within the CIDR blocks associated with the VCN. A VCN has comprises one or more subnets. Subnets are logical divisions of a VCN. One or more subnets may be created within a VCN. Each subnet has a range of non-overlapping IP addresses. CIDR blocks determine this range of addresses. Each subnet hosts a plurality of compute instances. A compute instance may be used to host a virtual machine of the cloud environment. A service gateway is a virtual router that is added to a VCN. The service gateway provides a path for private network traffic between a VCN and supported cloud services provided by the provider of the cloud environment. Traffic communicated via service gateway may be referred to herein as "service messages".

Detecting Inter-Tenancy Exfiltration in a Cloud Environment

A problem occurs when a malicious actor "steals" a principal (such as an instance principal), for use on a compute instance to which the principal was not originally granted. The stolen principal belongs to a particular tenancy; however, the malicious actor may use the stolen principal in another tenancy, or from outside of the cloud environment. As described below, the stolen principal may be used to exfiltrate data from one tenancy to another.

For example, a malicious actor creates or otherwise accesses a tenancy (referred to as a "malicious tenancy") of their own and sets up a piece of cloud infrastructure within the malicious tenancy, such as a compute instance within the malicious tenancy. The compute instance within the malicious tenancy is referred to as a "malicious compute instance." The malicious compute instance is granted an instance principal in the malicious tenancy, e.g., by the IAM.

The malicious actor then, using malicious means, gets illegitimate control of a compute instance within a second tenancy. The malicious actor then steals the instance principal from the malicious compute instance, and loads that stolen instance principal onto the compute instance within the second tenancy, where the second tenancy is referred to as a "victim tenancy," and the compute instance to which the stolen instance principal is loaded is referred to as a "victim compute instance" herein. Now, when transmitting service messages, the victim compute instance can present itself as the malicious compute instance of the malicious tenancy, as the victim compute instance has the stolen instance principal granted to the malicious compute instance.

Initially, the actor causes the victim compute instance to gather data from one or more cloud resources within victim tenancy. This is considered a legitimate operation, as the victim compute instance is within the victim tenancy, and such data gathering operation may not be flagged as being suspicious. The gathered data is proprietary of the victim tenancy, and is not supposed to be exfiltrated to a tenancy outside the victim tenancy, such as not supposed to be exfiltrated to the malicious tenancy.

Once the victim compute instance has gathered the data form the victim tenancy, the actor operates on the victim compute instance of the victim tenancy to send one or more service messages, via a service gateway of a VCN including the victim compute instance (e.g., a service gateway of the victim tenancy), to a cloud service of the malicious tenancy. In an example, the gathered data is included within or appended to the service messages.

Sending such service messages from a compute instance to a cloud service via the service gateway would be a normal use case of the service gateway. For example, in a normal use case in which the victim compute instance uses its own instant principal to send service messages, the victim compute instance would send, via the service gateway, such service messages to a cloud service of the "victim tenancy." But because the victim compute instance is now using the stolen instant principal of the malicious compute instance of the malicious tenancy, the victim compute instance can now send, via the service gateway, such service messages to the cloud service of the "malicious tenancy." This is because when sending the service message, the victim compute instance poses as the malicious compute instance of the malicious tenancy, and hence, the victim compute instance is allowed to transmit the service message to the cloud service of the malicious tenancy (although the victim compute instance is within the victim tenancy).

As described above, the service messages transmitted from the victim compute instance of the victim tenancy to the cloud service of the malicious tenancy includes the data gathered by the victim compute instance from the victim tenancy. Thus, this results in an exfiltration of such gathered data from the victim tenancy to the cloud service of the malicious tenancy, where the data within the cloud service of the malicious tenancy is accessible to cloud resources of the malicious tenancy. Such inter-tenancy exfiltration through the service gateway is difficult to detect, because the service gateway is intended for communications with the cloud services through such service messages.

With regard to the subject disclosure, in an example, a detection service operating within a services network of the provider of the cloud environment detects such inter-tenancy exfiltration through the service gateway. For example, the detection service detects the exfiltration based on (a) log entries of a log generated based on a service message and (b) inventory database mapping various cloud resources of the cloud environment.

As described below in further detail, the log is generated by Identity Data Plane (IDDP), e.g., based on the service gateway receiving a service message that is from the victim compute instance. In an example, the log includes one or more of the following information: (i) a target tenancy identification (ID) or name of a tenancy to which the service message is to be routed (e.g., which is the malicious tenancy in the above described exfiltration example); (ii) an originator VCN ID or name from which the service message originated (e.g., which is victim VCN including the victim compute instance in the above described exfiltration example); (iii) an originator IP address from which the service message originated (e.g., which is the IP address of the victim compute instance in the above described exfiltration example); and/or (iv) an originator tenancy ID or name of a tenancy from which the service message originated (e.g., which is victim tenancy in the above described exfiltration example).

As described below in further detail, in an example, the log may not include the originator tenancy ID or name of a tenancy from which the service message originated, but may include one or both of (i) an originator VCN ID or name from which the service message originated, or (ii) an originator IP address from which the service message originated. In such scenarios, the detection service uses, in addition to the log entries, the above-described inventory database, to determine the originator tenancy ID or name of the tenancy (such as the victim tenancy) from which the service message originated.

If a service message is legitimate, then a compute instance would transmit the service message to a cloud service of its own tenancy. Thus, a match between an originator tenancy of a service message and a target tenancy of the service message implies that the service message is most likely to be legitimate and from a legitimate compute instance.

However, if the service message is being maliciously transmitted as a part of inter-tenancy exfiltration of data from one tenancy to another, there would be a mismatch between the originator tenancy of the service message and the target tenancy of the service message. For example, for the above-described use case of data exfiltration, the originator tenancy of the service message would be the victim tenancy and the target tenancy of the service message would be the malicious tenancy.

Thus, in response to detecting a mismatch between the originator tenancy of the service message and the target tenancy of the service message, the detection system detects an exfiltration of data from the victim tenancy to the malicious tenancy. The detection service causes information indicative of the detected mismatch to be presented at a user interface (UI), for review by personnel of the cloud provider and/or of the cloud customer of the victim tenancy. In an example, the victim compute instance from which the service message originated is identified by the detection service. In an example, the victim compute instance is flagged as a risk, and protective actions are caused to be undertaken against the compute instance, e.g., by the detection service, as described below in further detail.

In an example, the detection of possibly malicious service messages may be done offline, in real time, or in near-real time. For example, for such an offline detection, the detection is performed after the service message has reached the target. In such a scenario, the detection aids in controlling the damage caused by the exfiltration, but the exfiltration cannot be prevented by the detection.

However, if the detection is done in real or near-real time, the exfiltration may be prevented. For example, upon detection of a possibly malicious service message by the detection service, the detection service (or another component of the cloud environment) may block passage of the service message, e.g., by preventing the service message from reaching its intended target, which is the cloud service of the malicious tenancy.

In an example, the detection service can process log entries of a single service message at a time, or may process log entries associated with a plurality of messages at least in part in parallel. Thus, the detection service may perform the detection operations based on an aggregation of log entries corresponding to a plurality of service messages.

Detecting Stealing of Principals, Such as Non-User Principals, in a Cloud Environment As described above, IAM provides authentication and authorization to control access to cloud resources in a cloud environment. Successful authentication results in granting an identity, such as a principal, to the requester. An identity associated with a principal is manifested as a session token granted by the IAM to the requester.

Various types of principals may be possible, based on the requester to whom the principal is assigned. For example, an "instance principle" is an identity assigned to a compute instance. For example, when a virtual machine (VM) is created within a tenancy of the cloud provider, the VM is issued the instance principal. A "resource principle" is similarly an identity assigned to a compute resource (e.g., a non-instance compute resource, such as an autonomous database, a memory, a virtual network component, etc.) within a tenancy of a cloud customer. A "service principal" is a special type of principal to be used by a service within the cloud environment. For example, a service principal enables a service to call a restricted API and access specified customer tenancies as defined in cross-tenancy policy language. A "user principal" is an identity assigned to a user of the cloud environment.

A "non-user principal" refers to a principal assigned to a "non-user entity" of the cloud environment. For purposes of this disclosure, a non-user entity of the cloud environment refers to a compute instance, a resource, or a service of the cloud environment. Thus, a non-user principal is granted to any of (i) a compute instance, (ii) a resource, or (iii) a service. Accordingly, a non-user principal comprises any of an instance principal, a resource principal, or a service principal. In contrast, as described above, a user principal is assigned to a user of the cloud environment.

A request for a non-user principal is accompanied by corresponding credentials, such as a key and/or a certificate. For example, credentials (such as corresponding one or more certificates and/or keys) are assigned to a non-user entity, e.g., during creation of the non-user entity and/or at another suitable time. When the non-user entity wants a corresponding non-user principal, a request for the non-user principal from the non-user entity to an authentication service includes (or is accompanied by) the corresponding credentials.

In an example, a non-user principal can be stolen when an underlying non-user entity within the cloud environment requests authorization for the corresponding non-user principal. For example, assume a first tenancy including a first non-user entity, and credentials are issued to the first non-user entity, where the first non-user entity may use the credentials to request a corresponding non-user principal. As described above, the first non-user entity may be a compute instance, a cloud resource, or a service within the cloud environment. Because the credentials are initially or originally assigned to the first non-user entity within the first tenancy, the first non-user entity is referred to herein as an "original non-user entity," and the first tenancy is referred to as an "original" tenancy. Similarly, a VCN including the original non-user entity is referred to as an "original VCN," which is within the original tenancy. Thus, credentials for a non-user principal are originally assigned to the original non-user entity that is within the original VCN, which is within the original tenancy.

Now, assume that a threat actor steals, or otherwise accesses, the credentials from the original non-user entity, and loads the credentials into a second non-user entity that is within a second tenancy. Now the second non-user entity requests a non-user principal using the credentials. Because the second non-user entity requests a non-user principal using the stolen credentials, the second non-user entity is also referred to as a "requesting non-user entity." Accordingly, the second tenancy is also referred to as a "requesting tenancy." Similarly, another VCN including the requesting non-user entity is referred to as an "requesting VCN," which is within the requesting tenancy.

Thus, the requesting non-user entity is within the requesting VCN, which is within the requesting tenancy, where the requesting non-user entity transmits a request for a non-user principal using credentials that were originally assigned to the original non-user entity. If the requested non-user principal is granted to the requesting non-user entity, this amounts to "stealing" of the non-user principal, as the non-user principal was originally intended for the original non-user entity, and not for the requesting non-user entity. Accordingly, the requesting non-user entity can misuse the issued principal to identify itself as the original non-user entity. Such stealing of the non-user may result in vulnerability in the cloud environment.

Accordingly, techniques are disclosed herein for detection of attempts to steal non-user principals within a cloud environment. In an example, the request for a non-user principal is received by an authentication endpoint of an authentication service, where the authentication service grants the non-user principal. A detection service works within, or in conjunction with the authentication service, where the detection service is configured to detect stealing of non-user principals within the cloud environment.

In an example and as will be described below in further detail, once the authentication service receives a request for a non-user principal, the detection service accesses one or more log files generated based on receipt of the request at a gateway of the requesting VCN, or at the authentication service. In an example, the detection service also accesses one or more supplemental database that includes (i) an inventory of IP addresses within the cloud environment, (ii) an inventory of various entities within the cloud environment, and/r (iii) external datasets including, for example, list of off-cloud public IP addresses from which a legitimate non-user entity can request a non-user principal, as described below in further detail.

In an example, based on the log files and/or the supplemental database, the detection service generates a dataset including information about the request for the non-user principal. This dataset includes, for example, one or more of an identity (ID) of the non-user entity requesting the non-user principal, a type of principal requested, a name of the non-user entity requesting the non-user principal, an ID of the requesting VCN, an IP address of the requesting non-user entity or the requesting VCN or a gateway within the requesting VCN, an ID of the requesting tenancy, an ID of the original tenancy, an operation to be performed using the non-user principal, and/or the like, as described below in further detail.

Using such information (e.g., the log files, the supplemental database, and/or the dataset), the detection service detects possibly anomalous or malicious requests for non-user principals. For example, the detection service can determine when a request for a non-user principal is out of line. For example, the detection service detects an originating information of the request for the non-user principal, and detects anomaly associated with such originating information.

Merely as an example, to detect an anomalous request for a non-user principal, the detection service determines if the request for the non-user principal is originating from outside the cloud environment, and is not within a safe list of off-cloud IP addresses. For example, if the request is from a non-cloud environment IP address that is not within a safe list of off-cloud IP addresses, this implies that someone has exfiltrated the credentials and are trying the steal the principal from outside the cloud environment. Upon such detection, the detection service flags the request to be possibly anomalous.

In another example, the detection service detects anomaly within the originating information associated with the request for the non-user principal, e.g., when the request for the non-user principal originates from an unexpected or anomalous public or private IP address within the cloud environment. In this example, assume that the request is actually coming from a public or private IP address assigned to the requesting tenancy, but the request is expected to come from public or private IP address assigned to the original tenancy (requesting tenancy and original tenancy have been described above). The detection service detects such a mismatch, and accordingly, flags the request to be possibly anomalous.

In yet another example, the detection service detects anomaly within the originating information associated with the request for the non-user principal, e.g., when the request for the non-user principal originates from an unexpected VCN. For example, the request is actually coming from a requesting VCN, but the request is expected to come from an original VCN (requesting VCN and original VCN have been described above). The detection service detects such a mismatch, and accordingly, flags the request to be possibly anomalous. Other example use cases for detecting a request for non-user entities to be possibly anomalous are also described below in further detail.

In an example, the detection service can detect the stealing of a non-user principal in real or near-real time (e.g., when the stealing is happening), and can prevent or at least reduce possibilities of the stealing. For example, if stealing is suspected, the request for the non-user principal may be blocked.

In another example, the detection service can review past logs, and detect the stealing after the stealing has occurred. In such an example, the detection service can warn the cloud provider or a cloud customers of one or more tenancies affected by the stealing. In an example, the detection service can flag the stolen non-user principal, and/or revoke or rescind the stolen non-user principal.

Detecting Inter-Tenancy Exfiltration in a Cloud Environment

FIG. 1 illustrates a block diagram of a cloud environment 100 that includes a detection service 178 for detection of inter-tenancy exfiltration of data. The cloud environment 100 comprises a cloud region 102. For example, the cloud environment 100 comprises several such cloud regions, where each region is within a corresponding geographical location, and an example cloud region 102 is illustrated in FIG. 1. For example, one or more physical cloud resources of the cloud region 102 may be physically located within a corresponding geographical location, such as within a data center, or within a city, or within a state, or within a country.

The cloud region 102 of the cloud environment 100 comprises a plurality of tenancies, such as tenancies 104 and 150. Although the cloud region 102 is likely to include more than two tenancies, only two such tenancies 104, 150 are illustrated in FIG. 1.

In an example, each of the tenancies 104, 150 is rented to a corresponding cloud customer. A cloud customer can grant permissions for accessing cloud resources within a tenancy that it rents, but the cloud customer should not be able to grant permissions for accessing cloud resources within another tenancy rented by other customers. A tenancy is a conceptual bucket that holds cloud resources belonging to a particular cloud customer. An administrator of a tenancy has administrative rights to set access policies for cloud resources in the tenancy; an administrator of a tenancy does not have administrative rights to set access policies for cloud resources in another tenancy. A tenancy of a cloud customer is isolated from another tenancy of another cloud customer. For example, during a normal course of operation of the tenancies 104, 150, data from a tenancy 104 may not be transmitted to the tenancy 150, and vice-versa. A tenancy of a cloud customer includes a plurality of active cloud resources, such as compute instances that are used to host virtual machines.

The tenancy 104 includes a plurality of Virtual Cloud Networks (VCNs), such as an example VCN 108 illustrated in FIG. 1. A VCN (such as the VCN 108) is a cloud customer-managed virtual, private, software defined network. The VCN 108 covers one or more classless inter-domain routing (CIDR) blocks. Cloud resources within the VCN 108 can communicate with each other through a private network path using IP addresses within the CIDR blocks associated with the VCN.

In an example, the VCN 108 comprises one or more subnets, such as the subnet 112. Subnets are logical divisions of a VCN. One or more subnets may be created within a VCN. Each subnet has a range of non-overlapping IP addresses. CIDR blocks determine this range of addresses. Subnets can be designated as either public or private. For example, the subnet 112 may be a public subnet or a private subnet.

Each subnet hosts a plurality of compute instances. For example, the subnet 112 includes an example compute instance 116. A compute instance may be used to host a virtual machine of the cloud environment 100.

Similarly, the tenancy 150 includes one or more VCNs, such as the VCN 158. The VCN 158 includes one or more subnets, such as the subnet 162. The subnet 162 includes one or more compute instances, such as the compute instance 156, in an example.

As described above, the tenancy 104 is rented out to a first cloud customer, and the tenancy 150 is rented out to a second cloud customer that is different from the first cloud customer. Accordingly, data from the tenancy 104 is not to be shared with cloud resources of the tenancy 150, and vice versa.

In an example, the cloud environment 100 includes an Identity and Access Management (IAM) (not illustrated in FIG. 1) that provides, among other things, authentication and authorization to control access to cloud resources in a cloud environment. An entity desiring access to a cloud resource may be referred to herein as an "access requester" or "requester," and may include various entity types, including user, compute instance, resource, or internal service. Authentication involves verifying that a requester's claims about itself are true. Successful authentication results in granting an identity, also referred to as a "principal," to the requester. A principal may be granted initially to the requester, and may be periodically or intermittently refreshed. For example, an instance principle is an identity assigned to a compute instance. For example, when a virtual machine (VM) is created within a tenancy of the cloud provider, the VM is issued the instance principal. The instance principle can be configured to be assigned to a dynamic group, and policies can be assigned to the dynamic group, which then dictates various permissions associated with the instance. An identity associated with a principal is manifested as a session token granted by the IAM to the requester. Authorization involves verifying that a requester with a certain identity, as evidenced by presentation of the session token, has permission to access a cloud resource. Successful authorization results in permitting the requested access to the requested cloud resource.

For example, the compute instance 156 is assigned an instance principal 157, and the compute instance 116 is assigned an instance principal 117. For example, the IAM issues the instance principals 117, 157, respectively, to the compute instances 116, 156.

In an example, the cloud environment 100 provides a service network 130, through which the provider of the cloud environment 100 (also referred to herein as a cloud provider) provides one or more services to the various tenancies of the cloud environment 100. Each cloud region of the cloud environment 100 may host one or more corresponding such service networks. For example, the cloud region 102 of the cloud environment 100 hosts the service network 130.

The service network 130 provides one or more services to corresponding one or more tenancies within the cloud region 102. For example, the service network 130 includes services 140 providing corresponding one or more services to cloud resources (such as compute instances, e.g., the compute instance 116) of the tenancy 104. Similarly, the service network 130 includes services 142 providing corresponding one or more services to cloud resources (such as compute instances, e.g., the compute instance 156) of the tenancy 150.

A service gateway is a virtual router that can optionally be added to a VCN. For example, the service gateway 120 (also referred to simply as a service gateway 120, or SWG 120) is added to the VCN 108. The service gateway 120 provides a path for private network traffic between a VCN and supported services within the service network 130. Thus, using the service gateway 120, a compute instance of the VCN 108 (such as the compute instance 116) transmits service messages to the corresponding services 140 of the service network 130, without needing a public IP address or access to the Internet to avail the services offered by the service network 130. For example, database (DB) systems in a private subnet in a customer VCN can back up data to Object Storage without needing public IP addresses or access to the Internet, and such back up of data can be performed through the service gateway 120. Similarly, a service gateway 121 is added to the VCN 158 of the tenancy 150. Traffic communicated via service gateways may be referred to herein as "service messages".

The services 140 are associated with the tenancy 104, and the services 142 are associated with the tenancy 150. For example, the services 140 are executed from within the tenancy 104, and the services 142 are executed from within the tenancy 150.

The services 140, 142 can be any appropriate services provided by the provided of the cloud environment 100. An example of services 142 is a storage service, in which data received by the services 142 is stored within a storage repository 143, as illustrated in FIG. 1.

In an example, the storage repository 143, to which the services 142 store data, is accessible to the cloud resources of the tenancy 150 (and not to the cloud resources of the tenancy 104). Similarly, another the storage repository (not illustrated in FIG. 1), to which the services 140 store data, is accessible to the cloud resources of the tenancy 104 (and not to the cloud resources of the tenancy 150).

In an example, the services 140 may include one or more services that is offered to a corresponding compute instance, e.g., if a corresponding request for the service is received through a service gateway associated with the corresponding tenancy 104. For example, in such an example, the services 140 may not (or may) verify an identity of the compute instance 116. But as the compute instance 116 transmits a service message through the service gateway 120 of the tenancy 104, the service 140 may be offered to the compute instance 116.

As described above, the services 140 are offered to cloud resources of the tenancy 104, whereas the services 142 are offered to cloud resources of the tenancy 104. For example, the compute instance 116 transmits a service message 180 to the services 140 through the service gateway 120, e.g., to avail one or more services offered by the services 140. Similarly, the compute instance 156 may transmit a service message to the services 142 through the gateway 121, e.g., to avail one or more services offered by the services 142. Note that because the instance principal 117 is assigned to the compute instance 116 (where the instance principal 117 identifies the compute instance 116), the compute instance 116 having the assigned instance principal 117 can avail services offered by the services 140, and may not avail services offered by the services 142. Similarly, because the instance principal 157 is assigned to the compute instance 156 (where the instance principal 157 identifies the compute instance 156), the compute instance 156 having the assigned instance principal 157 can avail services offered by the services 142, and may not avail services offered by the services 140.

In an example and as described below in detail, there may be attempts to exfiltrate data from the tenancy 104 to the tenancy 150 using service messages from the compute instance 116. For example, a stolen instance principal 157 of the compute instance 156 may be loaded on the compute instance 116, using which the compute instance 116 may attempt to exfiltrate data from the tenancy 104 to the tenancy 150 using service messages and through the service gateway 120. In an example, in order to prevent or at least detect such exfiltration from the tenancy 104 to the tenancy 150, the service network 130 includes a detection service 178, as described below with respect to FIG. 2 in further detail.

In an example, the scope of exfiltration of information from one tenancy to another may be restricted to scenarios where both tenancies are within the same cloud region 102 of the cloud environment 100. For example, as described above, the cloud environment 100 may include a plurality of cloud regions, an example of which is the cloud region 102. The service gateway 120 may transmit service messages to tenancies that are within the same cloud region as the service gateway 120. For example, the service gateway 120 may not transmit a service message to a tenancy that is external to the cloud region 102. Similarly, the service gateway 121 may transmit service messages to tenancies that are within the same cloud region as the service gateway 121. Accordingly, in such an example, the tenancy from which exfiltration occurs and the tenancy to which the exfiltration occurs has to be within the same cloud region, such as the tenancies 104, 150 within the cloud region 102.

However, in another example, the service gateway 120 may transmit service messages to tenancies that are external to the cloud region as the service gateway 120. In such as example, the tenancies 104 and 150 need not be within the same cloud region, and exfiltration may occur across tenancies within different cloud regions.

Figure 2:
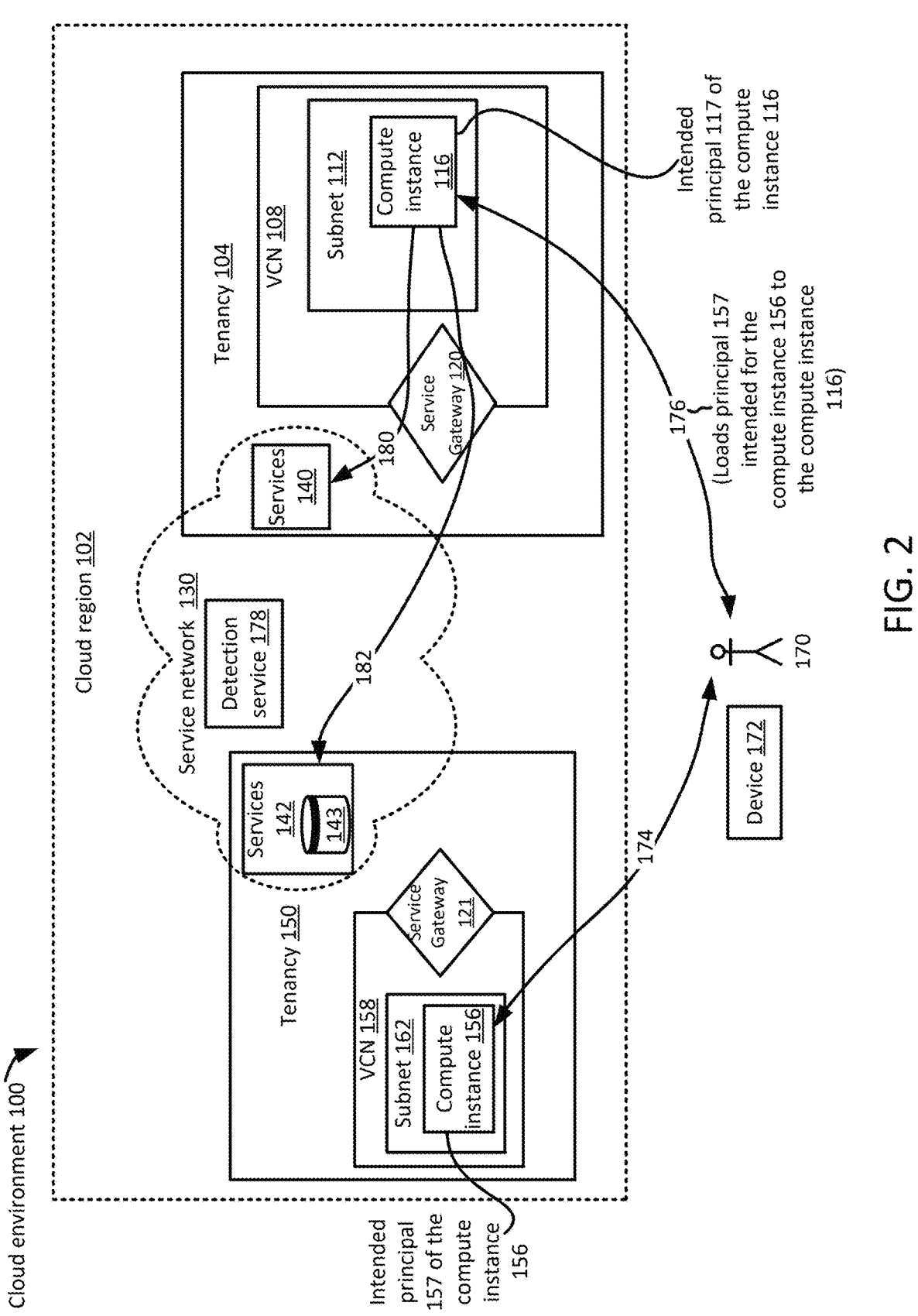
FIG. 2 illustrates a block diagram of a cloud environment, and further illustrates an inter-tenancy exfiltration of data.

FIG. 2 illustrates a block diagram of the cloud environment 100 of FIG. 1, and illustrates an inter-tenancy exfiltration of data. The cloud environment 100 of FIG. 2 is the same as the cloud environment 100 of FIG. 1. For example, the tenancy 104 comprises the compute instance 116, and the tenancy 150 comprises the compute instance 156. Also, as described above, in an example, an intended instance principal for the compute instance 116 is the instance principal 117; and an intended instance principal for the compute instance 156 is the instant principal 157.

However, assume that a malicious actor 170 (such as a threat actor) wants to exfiltrate data from the tenancy 104. To enable such an exfiltration of data, the actor 170 may legitimately (or illegitimately) set up the tenancy 150 with the cloud provider, or somehow (legitimately or maliciously) get access to the tenancy 150. The actor 170 now wants to exfiltrate data from the tenancy 104 to the tenancy 150.

In an example, the actor 170 uses a device 172 to interact with the cloud environment 100. The actor 170 interacts with the IAM of the cloud environment 100, such that the compute instance 156 is assigned the instance principal 157.

Now, as the compute instance 156 of the tenancy 150 is assigned the instance principal 157, a compute instance with the instance principal 157 may be used to access or avail the services 142 which are for cloud resources of the tenancy 150. The actor 170 access the instance principal 157 (which was originally granted, or supposed to be granted, to the compute instance 156 of the tenancy 150), illustrated symbolically as 174 in FIG. 2.

Subsequently, the actor 170 loads the instance principal 157 into the compute instance 116. For example, the actor 170 maliciously gains access to the compute instance 116 of the tenancy 104. Once the actor 170 maliciously gains access to the compute instance 116 of the tenancy 104, the actor 170 then loads the instance principal 157 of the compute instance 156 onto the compute instance 116, illustrated symbolically as 176 in FIG. 2. Thus, the actor 170 infects the compute instance 116, by loading the instance principal 157 of the compute instance 156 on the compute instance 116

Now, the instance principal 157 of the compute instance 156 is loaded on the compute instance 116 of the tenancy 104. Because the compute instance 116 has the instance principal 157 of the compute instance 156, the compute instance 116 may now act as (such as identify itself as) the compute instance 156. Accordingly, the compute instance 116 of the tenancy 104 may transmit service messages to the service network 130, while pretending to be the compute instance 156.

Furthermore, because the instance principal 157 of the compute instance 156 of the tenancy 150 is loaded into compute instance 116, the compute instance 116 now can send service messages to the services 142 (e.g., instead of sending service messages to the services 140). Such service messages from the infected compute instance 116 to the services 142 are labelled as 182 in FIG. 2.

Without the actions of the malicious actor 170, the compute instance 116 would have been assigned the instance principal 117, using which the compute instance 116 would have transmitted service messages to the services 140 (labelled as 180 in FIGS. 1 and 2), but not to services 142. But now because the malicious actor 170 has loaded the instance principal 157 onto the infected compute instance 116, the compute instance 156 of the tenancy 104 may transmit service messages to the services 142 via the service gateway 120, while pretending to be the compute instance 156.

In an example, the compute instance 116 gathers information associated with the tenancy 104, e.g., as the compute instance 116 is legitimately within the tenancy 104. For example, the compute instance 116 gathers information from one or more cloud resources within the tenancy 104. Subsequently, when the compute instance 116 generates the service messages, where the compute instance 116 appends or includes the gathered information with such service messages. Furthermore, as the services 142 are associated with the tenancy 150, any cloud resource within the tenancy 150 may access such information. In an example, the services 142 stores such information in the storage repository 143 accessible to (or is a part of) the services 142, and cloud resources within the tenancy 150 may access such information from the storage repository 143. This results in exfiltration of information from the tenancy 104 to the tenancy 150.

In an example, such exfiltration via the service gateway 120 may be difficult to detect, because the service gateway 120 is intended for communications between the compute instance 116 and the service network 130. Furthermore, as the compute instance 116 is using the stolen instance principal of a compute instance of the tenancy 150, communication between the compute instance 116 and the services 142 may not generally be suspicious.

Figure 3:
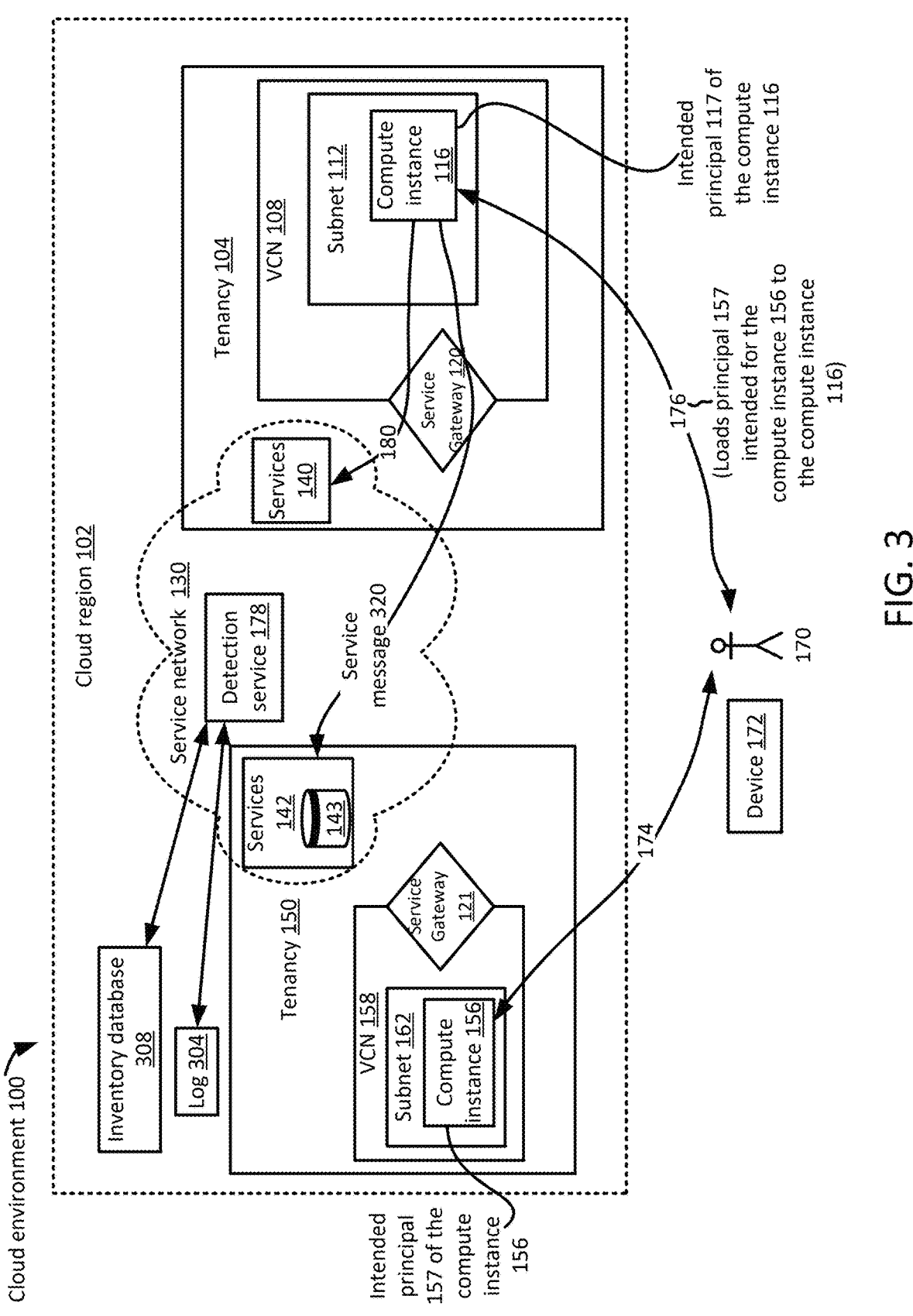
FIG. 3 illustrates a block diagram of a cloud environment, in which a detection service detects inter-tenancy exfiltration of data.

FIG. 3 illustrates a block diagram of the cloud environment 100 of FIGS. 1 and 2, in which the detection service 178 detects inter-tenancy exfiltration of data. The cloud environment 100 of FIG. 3 is the same as the cloud environment 100 of FIGS. 1 and 2. For example, the malicious actor 170 loads the stolen instance principal 157 of the compute instance 156 of the tenancy 150 onto the compute instance 116 of the tenancy 104, which facilitates in the compute instance 116 exfiltrating data from the tenancy 104 to the storage repository 143 associated with the services 142 and the tenancy 150. For example, the compute instance 116 transmits service messages (such as a service message 320 illustrated in FIG. 3) to the services 142 via the service gateway 120, where one or more of the service messages may include the exfiltrated information.

In an example, to detect attempts to exfiltration information from the infected compute instance 116 to the services 142, the detection service 178 operates within the service network 130. The detection service 178, in an example, is operated by the provider of the cloud environment 100.

In an example, the detection service 178 accesses a log 304 associated with receipt of the service message 320 by the services 142 and/or by the service gateway 120. For example, the service message 320 is transmitted by the compute instance 116 to the services 142, through the service gateway 120 (e.g., while the compute instance 116 is identifying itself as the compute instance 156, using the stolen instance principal 157 of the compute instance 156).

In an example, the log 304 may be generated by the service gateway 120, the services 142, and/or another appropriate components of the cloud environment 100 (such as an Identity Data Plane (IDDP)). For example, whenever a service message is to be sent, the service gateway 120 and/or the IDDP (not illustrated in FIG. 3) has to verify an identity (such as an instance principal) of the originator of the service message. The IDDP, in an example, records or logs information associated with one or more interactions (such as every interactions) of service messages with the IDDP.

For example, the IDDP allows the service message 320 to be transmitted to the services 142 (e.g., instead of the services 140) upon a verification that the originator of the service message 320 (which is the compute instance 116) has an instance principal 157 assigned to a compute instance of the tenancy 150 (albeit the instance principal 157 being stolen, and maliciously loaded on the compute instance 116). During such a verification process, the IDDP generates the log 304 associated with the service message 320.

In any case, the log 304 is generated by an appropriate component of the cloud environment 100, and is associated with a receipt (e.g., by the services 142 or the service gateway 120) of the service message 320. Thus, for example, each time a service message is transmitted through a service gateway of a VCN of the cloud environment 100, a corresponding log is generated.

A service message is transmitted from a compute instance to destination cloud resources (such as service 142). The cloud resource from which the service message originated is referred to as an originator of the service message. Similarly, a tenancy and a VCN from which the service message originated is referred to as an originator VCN and an originator tenancy, respectively. Similarly, a tenancy including one or more services, which is an intended recipient of the service message, is referred to as a target tenancy of service message.

Information which may be used to identify the originator of the service message, the originator tenancy, and/or the originator VCN is referred to herein as originating information. Information which may be used to identify the target of the service message, the target tenancy, and/or the target VCN is referred to herein as target information.

In an example, the log 304 includes information about the service message 320. FIG. 4 illustrates the log 304 including example log entries, where the log is generated based receipt of the service message 320 (e.g., by the service gateway 120, or the IDDP).

In an example, the log 304 includes one or more of the following information: (i) a target tenancy identification (ID) or name of a tenancy to which the service message is to be routed; (ii) an originator VCN ID or name from which the service message originated; (iii) an originator IP address from which the service message originated; and/or (iv) an originator tenancy ID or name of a tenancy to which the service message originated. For example, the log 304, which is generated based on the service message 320, may include one or more of the following information: (i) the tenancy ID or name of the tenancy 150 as being the target tenancy for the service message, (ii) the VCN ID or name of the VCN 108 as being the originator VCN; (iii) an IP address of the compute instance 116 as being the originator IP address; and/or (iv) the tenancy ID or name of tenancy 104 as being the originator tenancy.

Note that the log 304 may not include all such items listed above (and illustrated in FIG. 4), and may include merely one, or two, or three of the listed items. For example, in one implementation, the log 304 does not include an originator tenancy ID or name, or an identification of the tenancy including the compute instance from which the service message originated. In an example, the log 304 may include the target tenancy ID or name of a tenancy to which the service message is to be routed, and additionally include at least one of (i) the originator VCN ID or name, (ii) the originator IP address from which the service message originated, and (iii) the originator tenancy ID or name of a tenancy.

In an example, in addition to the log 304, the detection service 178 also accesses an inventory database 308, as illustrated in FIG. 3. FIG. 5 illustrates an inventory database 308 mapping various cloud resources of the cloud environment 100 of FIG. 1-3. FIG. 6 illustrates another inventory database 308a mapping various cloud resources of the cloud environment 100 of FIG. 1-3. The inventory database 308a of FIG. 6 is an alternate version of the inventory database 308 of FIG. 5, and the detection service 178 may use any of the inventory databases 308, 308a.

The inventory databases 308, 308a of FIGS. 5 and 6, respectively, may be stored in a storage repository that is accessible to the detection service 178. In an example, the provider of the cloud environment 100 maintains the inventory databases 308, 308a, so as to keep track of cloud resources used by various cloud customers and/or keep track of cloud resources allocated to various cloud customers.

For example, referring to FIGS. 5 and 6, each VCN is mapped to a corresponding tenancy. For example, the databases 308, 308a indicate that the VCN 108 is within the tenancy 104, the VCN 158 is within the tenancy 150, and so on. Thus, for individual (such as each) VCN within the cloud environment 100, the databases 308, 308a provide the corresponding VCN ID, and the ID of the tenancy containing the VCN.

In an example, a VCN covers one or more CIDR blocks. Cloud resources within a VCN can communicate with each other through a private network path using IP addresses within the CIDR blocks associated with the VCN. Thus, each VCN is associated with one or more IP addresses. In an example, the inventory databases 308, 308a of FIGS. 5 and 6 may also store, corresponding to individual (such as each) VCN of the cloud environment 100, corresponding one or more IP addresses issued to cloud resources (such as compute instances) within the VCN. The IP addresses depicted in FIGS. 5 and 6 are mere examples and do not represent realistic IP addresses.

In an example, in order to monitor for exfiltration of data from tenancy 104 to the tenancy 150 via services messages (such as the service message 320) transmitted by the infected compute instance 116, the detection service accesses the log 304, and identifies one or more log entries therein associated with the service message 320. Based at least in part on the log entries of the log 304 and/or the inventory database 308, the detection service 178 identifies information identifying (i) an originator of the service message 320 and (ii) a target of the service message 320. The detection service 178 then determines whether there is match between such originating information and the target information. If there is no match, then the detection service 178 identifies a possible exfiltration and sends out an alert.

For example, based at least in part on the log entries of the log 304 and/or the inventory database 308, the detection service 178 identifies an originator tenancy of the service message 320 and a target tenancy of the service message 320. In the case of the service message 320, the detection service 178 identifies the originator tenancy 104 of the service message 320 and the target tenancy 150 of the service message 320.

If the service message is legitimate, then a compute instance would transmit the service message to the services of its own tenancy. Thus, a match between an originator tenancy of a service message and a target tenancy of the service message implies that the service message is most likely to be legitimate and from a legitimate compute instance.

However, if the service message is being maliciously transmitted as a part of inter-tenancy exfiltration of data from one tenancy to another, there would be a mismatch between the originator tenancy of the service message and the target tenancy of the service message. In FIG. 3, because there is a mismatch between the originator tenancy 104 of the service message 320 and the target tenancy 150 of the service message 320, the detection service 178 detects a possible exfiltration attempt from the tenancy 104 to the tenancy 150.

In an example, in response to detecting the mismatch between the originating information of the service message 320 and the target information of the service message 320, the detection service 178 presents information indicative of the detected mismatch at a user interface (where the UI is not illustrated in FIG. 3). In an example, additionally (or alternatively), the detection service 178 also flags the service message as being possibly malicious, and the service message possibly trying to exfiltrate information from the tenancy 104 to the tenancy 150. For example, the detection service 178 also presents information indicative of such flagging at the user interface.

In an example, the user interface is accessible by the provider of the cloud environment 100, and the provider of the cloud environment 100 is now aware of the detected mismatch indicative of a possible inter-tenancy exfiltration from the tenancy 104 to the tenancy 150. In another example, the user interface is accessible by the cloud customer to whom the tenancy 104 is rented out, and the cloud customer is now aware of the detected mismatch indicative of a possible inter-tenancy exfiltration from the tenancy 104 to the tenancy 150.

In an example, the detection service 178 also identifies a compute instance (such as the compute instance 116) from which the possibly malicious service message 320 originated. In an example, in response to the detection service 178 indicating the above-described detected mismatch, the detection service may also flag the identified compute instance as a risk.

In response, the provider of the cloud environment 100 and/or the cloud customer (to whom the tenancy 104 is rented out) may undertake protective actions against the compute instance. Such protective actions may include, for example, terminating the compute instance, flagging the compute instance as possibly being infected, executing a malware detection system on the compute instance, verify an instance principal of the compute instance, and/or other protective actions.

In an example and as described above, the exfiltration attempt may be possible due to the stolen instance principal 157 originally intended for the compute instance 156, and loading the stolen instance principal 157 to the compute instance 116. In an example, protective actions undertaken by the provider of the cloud environment 100 and/or the cloud customer (to whom the tenancy 104 is rented out), based on the detection of the possibly malicious service message, may also include revoking the instance principal 157, such that the same instance principal 157 may not be used for any further malicious activities.

As described above, the detection service 178 identifies information identifying (i) an originator of the service message 320 (such as the originator tenancy 104 of the service message 320) and (ii) a target of the service message 320 (such as the target tenancy 150 of the service message 320). Based on such identification of the information, the detection service 178 can subsequently detect a malicious attempt to exfiltrate from the originator tenancy 104 to the target tenancy 150. In an example, the detection service 178 identifies the originator tenancy 104 and the target tenancy 150 using log entries of the log 304 and the inventory database 308.

For example, as described above with respect to FIG. 4, the log 304 may include the target tenancy identification (ID) or name of a tenancy to which the service message is to be routed, and additionally include at least one of (i) the originator VCN ID or name, (ii) the originator IP address from which the service message originated, and (iii) the originator tenancy ID or name of a tenancy.

Thus, from the log entries of the log 304, the detection service 178 can identify the target tenancy ID or name. The detection service 178 can also identify the originator tenancy ID or name directly from the log 304, if such information is populated in the log entries of the log 304.

However, instead of the originator tenancy ID or name, in an example, the log 304 may include one or more of (i) the originator VCN ID or name, and (ii) the originator IP address from which the service message originated. In such an example, the detection service 178 identifies the originator tenancy ID or name from the log 304 and the inventory databases 308 or 308a.

For example, assume an example scenario in which the log 304 includes the originator VCN ID or name, such as an ID of the VCN 108 from which the service message 320 originated. In such a scenario, the detection service 178 uses any of the inventory databases 308 or 308a to map the ID of the VCN 108 to the ID or name of the originator tenancy 104, thereby being aware of the originator tenancy 104 from which the service message 320 generated.

In another example scenario, assume that the log 304 includes the IP address from which the service message 320 originated, such as the IP address assigned to the compute instance 116. In such a scenario as well, the detection service 178 uses any of the inventory databases 308 or 308a to map the IP address to the ID or name of the originator tenancy 104. For example, if using the inventory database 308, the detection service 178 initially maps the IP address to the VCN ID associated with the IP address, and subsequently maps the VCN ID to the ID or name of the originator tenancy 104 from which the service message 320 generated.

Thus, in the above two examples in which the log 304 includes at least one of (i) the originator VCN ID or name and (ii) the originator IP address from which the service message originated, the detection service 178 identifies the originator tenancy ID or name from the log 304 and the inventory databases 308 or 308a.

Furthermore, as described above, once the detection service 178 has the originator tenancy ID or name, the detection service 178 compares the originating information with the target information, to detect whether the service message 320 is possibly malicious and attempting an inter-tenancy exfiltration. For example, a mismatch between the originator tenancy and the target tenancy is an indication of the service message 320 being possibly malicious, as described above in detail.

Although not illustrated in FIG. 4, in an example, the log 304 may also include an identification of a compute instance 116 from which the service message 320 originated. In an example, one or both the inventory databases 308, 308a may include a mapping between the compute instance 116 and the corresponding VCN 108. In an example, using such information, the detection service 178 maps the identification of the compute instance 116 to the originator tenancy 104 that includes the compute instance 116.

In an example, the detection of the possibly malicious service message may be done offline, in real time, or in near-real time. For example, for such an offline detection, the detection is performed after the service message 320 has reached the target. In such a scenario, the detection aids in controlling the damage caused by the exfiltration, but the exfiltration cannot be prevented by the detection.

However, if the detection is done in real or near-real time, the exfiltration may be prevented. For example, upon the detection of the possibly malicious service message 320 by the detection service 178, the detection service 178 (or another component of the cloud environment 100) may block passage of the service message 320, e.g., by preventing the service message 320 from reaching its intended target.

In an example, the detection service 178 can process log entries of a single service message at a time, or may process log entries associated with a plurality of messages at least in part in parallel. Thus, detection service 178 may perform the detection operations based on an aggregation of log entries corresponding to a plurality of service messages.

FIG. 7 illustrates a flow diagram depicting a method 700 for detecting inter-tenancy exfiltration of data within the cloud environment 100 of FIG. 1-3.

At 704, a log that includes information associated with receipt of a service message at a gateway within a cloud environment is accessed. For example, the detection service 178 accesses the log 304. In an example, the log 304 is generated by IDDP, e.g., based on the service gateway 120 receiving the service message from the compute instance 116 and for transmission to the services 142 within the tenancy 150.

At 708, based at least in part on the log, the following are determined: (i) originating information of the service message and (ii) target information of the service message. For example, the detection service 178 determines the originating information and the target information of the service message, based at least in part on the log and the inventory databases 308 or 308a.

At 712, the originating information of the service message and the target information of the service message are compared, e.g., by the detection service 178.

At 716, a mismatch between the originating information of the service message and the target information of the service message is detected, e.g., by the detection service 178.

At 720, in response to the detected mismatch between the originating information of the service message and the target information of the service message, information indicative of the detected mismatch is caused to be presented at a user interface (UI). For example, the detection service 178 causes the information to be presented at the UI.

At 724, a compute instance from which the service message originated is identified, e.g., by the detection service 178.

At 728, in response to the detected mismatch, the compute instance is flagged as a risk, and protective actions are caused to be undertaken against the compute instance, e.g., by the detection service 178.

Detecting Stealing of Principals, Such as Non-User Principals, in a Cloud Environment As described above in further detail, IAM provides authentication and authorization to control access to cloud resources in a cloud environment. Successful authentication results in granting an identity, such as a principal, to the requester. As also described above, a non-user entity of a cloud environment 100 refers to any of a compute instance, a cloud resource, or a service within the cloud environment. Similarly, a non-user principal refers to a principal assigned to a non-user entity of the cloud environment, such as a principal assigned to a compute instance, a resource, or a service of the cloud environment. Accordingly, a non-user principal comprises any of an instance principal, a resource principal, or a service principal. In contrast, as described above, a user principal is assigned to a user of the cloud environment. In an example, a non-user principal can be stolen, e.g., when the underlying non-user entity within the cloud environment requests authorization for the corresponding principal, as described below in further detail. Note that by stealing a non-user principal (such as an instant principal), a malicious actor can attempt to perform malicious acts, such as attempt to exfiltrate data from one tenancy to another tenancy within a cloud region of a cloud environment, as described above with respect to FIGS. 1-7.

Figure 8:
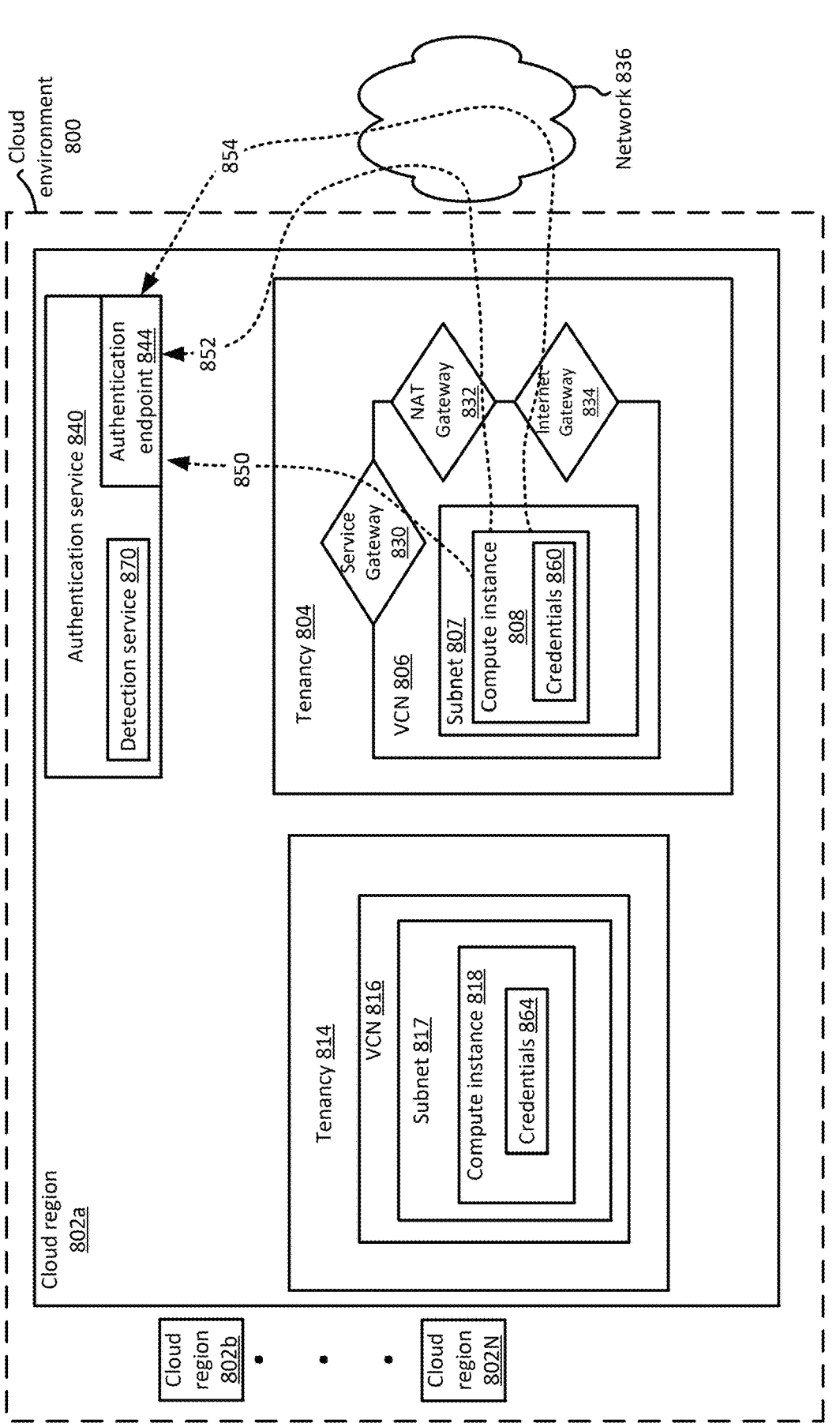
FIG. 8 illustrates a cloud environment, and further illustrates possible traffic paths through which a non-user entity (such as a compute instance, or a cloud resource, or a service within the cloud environment) may transmit a request for a corresponding non-user principal to an authentication service.

FIG. 8 illustrates a cloud environment 800, and further illustrates possible traffic paths through which a non-user entity 808 (such as a compute instance 808) may transmit a request for a corresponding non-user principal to an authentication service 840.

In FIG. 8, the non-user entity 808 requesting the non-user principal is a compute instance 808 requesting an instance principal. However, the teaching of this disclosure also applies to other non-user entities (such as a cloud resource or a cloud service) requesting other types of non-user principals (such as a resource principal or a service principal). Thus, the compute instance 808 of FIG. 8 may be replaced by another non-user entity, such as a cloud resource or a cloud service.

The cloud environment 800 comprises a plurality of cloud regions 802a, 802b, . . . , 802N, where each cloud region is within a corresponding geographical location, as also described above with respect to FIG. 1. In FIG. 8, example traffic paths for principal request within an example cloud region 802a is illustrated, and the teachings also apply to other cloud regions 802b, . . . , 802N.

The cloud region 802a includes a plurality of tenancies, such as two example tenancies 804 and 814 illustrated in FIG. 8. Although the cloud region 802a is likely to include more than two tenancies, only two such tenancies 804, 814 are illustrated in FIG. 8. In an example, each of the tenancies 804, 814 is rented to a corresponding cloud customer. Restrictions associated with tenancies have been described above with respect to FIG. 1. For example, the tenancy 804 rented out to a first cloud customer is isolated from the tenancy 814 rented out to another cloud customer.

The tenancy 804 includes a plurality of VCNs, such as an example VCN 806 illustrated in FIG. 8. In an example, the VCN 806 comprises one or more subnets, such as the subnet 807. VCNs and subsets within a tenancy have been described above in detail with respect to FIG. 1.

Each subnet hosts a plurality of compute instances. For example, the subnet 807 includes a plurality of compute instances, such as an example compute instance 808. A compute instance may be used to host a virtual machine of the cloud environment 800.

Similarly, the tenancy 804 includes a plurality of VCNs, such as the VCN 816. The VCN 816 includes one or more subnets, such as the subnet 817. The subnet 817 includes one or more compute instances, such as the compute instance 818, in an example.

As described above, the tenancy 804 is rented out to a first cloud customer, and the tenancy 814 is rented out to a second cloud customer that is different from the first cloud customer. Accordingly, data and/or non-user principals from the tenancy 804 are not to be shared with the tenancy 814, and data and/or non-user principals from the tenancy 814 are not to be shared with the tenancy 804.

In an example, the cloud environment 800 includes an authentication service 840. For example, the authentication service 840 implements the above-described Identity and Access Management (IAM) that provides, among other things, authentication and authorization to control access to cloud resources in a cloud environment. Among other things, in an example, the authentication service 840 is configured to grant various principals to various entities within the cloud environment 800. For example, when the non-user entity wants to perform an operation within the cloud environment 800, the non-user entity requests a corresponding non-user principal from the authentication service 840. Once granted, the non-user entity relies on the non-user principal for authorization, to subsequently perform the operation.

In an example, the authentication service 840 includes an authentication endpoint 844 to communicate with a plurality of entities of the cloud environment 100, such as a plurality of entities within the cloud region 802a of the cloud environment 100 (e.g., various user and non-user entities, such as the compute instances 808, 818, etc.). In an example, the authentication service 840 may also include (or may be associated with) a detection service 870, which may detect any attempt to steal a non-user principal, as will be described below in further detail.

The authentication service 840 grants non-user principals to non-user entities of the cloud environment 800, and/or grants user principals to users of the cloud environment 800. As described above, compute instances 808, 818 are example non-user entities of the cloud environment 800. Accordingly, if requested by the compute instances 808, 818, the authentication service 840 will grant a first non-user principal and a second non-user principal (such as a first and a second instance principals) to the compute instances 808, 818, respectively. A non-user principal may be initially granted to a non-user entity (such as any of the compute instances 808, 818), and the non-user principal may be periodically or intermittently refreshed or reissued. For example, a non-user principal forms an identity assigned to a corresponding non-user entity.

As described above, a service gateway is a virtual router that can optionally be added to a VCN. For example, a service gateway 830 is added to the VCN 806. The service gateway 830 provides a path for private network traffic between a VCN and supported services provided by the cloud provider, such as the authentication service 840. Thus, using the service gateway 830, a compute instance of the VCN 806 (such as the compute instance 808) communicates with the authentication service 840 over a traffic path 850, without needing a public IP address or access to the Internet. For example, when a compute instance does not have access to the Internet and/or prefers to communicate via a service gateway, the compute instance communicates with one or more services through the service gateway 830. Although not illustrated, a service gateway may similarly be added to the VCN 816 of the tenancy 814.

In an example, instead of (or in addition to) communicating with the authentication service 840 through the service gateway 830, the compute instance 808 may also communicate with the authentication service 840 through a Network Address Translation (NAT) gateway 832 over a traffic path 852, and/or through an internet gateway 834 over a traffic path 854. Such communicate is routed through a network 836 that is external to the cloud environment 100, such as routed through the Internet 836. Thus, for example, when using the NAT gateway 832 and/or the internet gateway 834, communication is via the Internet 836.

In an example, the NAT gateway 832 is an optional gateway added to the VCN 806. The NAT gateway 832 may be used by compute instances within a private subnet 807 to connect to services (such as the authentication service 840) outside the VCN 806 over the external network 836, but an external services may not initiate a connection with such compute instances through the NAT gateway 832. Thus, the NAT gateway 832 to the VCN 806 provides compute instances (such as the compute instance 808) within a private subnet 807 access to the Internet. In an example, compute instances in a private subnet may not have public IP addresses. With the NAT gateway 832, such compute instances can initiate connections to the Internet and make connection to various cloud services (such as the authentication service 840) over the Internet and receive responses, but not receive inbound connections initiated from the Internet.

The internet gateway 834 is another optional gateway added to the VCN 806, e.g., to enable direct connectivity to the Internet. The internet gateway 834 supports connections initiated from within the VCN (e.g., such as an egress connection initiated by the compute instance 808) and connections initiated from the Internet (e.g., ingress connection to the compute instance 808). In an example, to use the internet gateway 834 for internet access, the compute instance 808 has to have a public subnet (such as a public subnet 807) and a public IP address. If the compute instance 808 has a private IP address, the compute instance 808 may instead use the NAT gateway 832 to initiate connections to the Internet.

Thus, the compute instance 808 communicates with the authentication endpoint 844 via any of the service gateway 830, the NAT gateway 832, or the internet gateway 834, e.g., based on an availability of such gateways in the VCN 806 and/or based on a preference configured within the compute instance 808.

In an example, a compute instance communicates with the authentication endpoint 844, to receive an instance principal from the authentication service 840. A request for the instance principal is accompanied by corresponding credentials, such as a key and/or a certificate. For example, credentials 860 (such as corresponding one or more certificates and/or keys) are assigned to the compute instance 808, and the credentials 864 (such as corresponding one or more certificates and/or keys) are assigned to the compute instance 818.

When the compute instance 808 transmits the request for a corresponding instance principal for the compute instance 808, such a request is supposed to be accompanied by the credentials 860 assigned to the compute instance 808. Similarly, when the compute instance 818 transmits a request for a corresponding instance principal for the compute instance 818, such a request is supposed to be accompanied by the credentials 864. Credentials are issued to a compute instance, e.g., when the compute instance is created by a corresponding cloud customer, or at another suitable time period.

Figure 9:
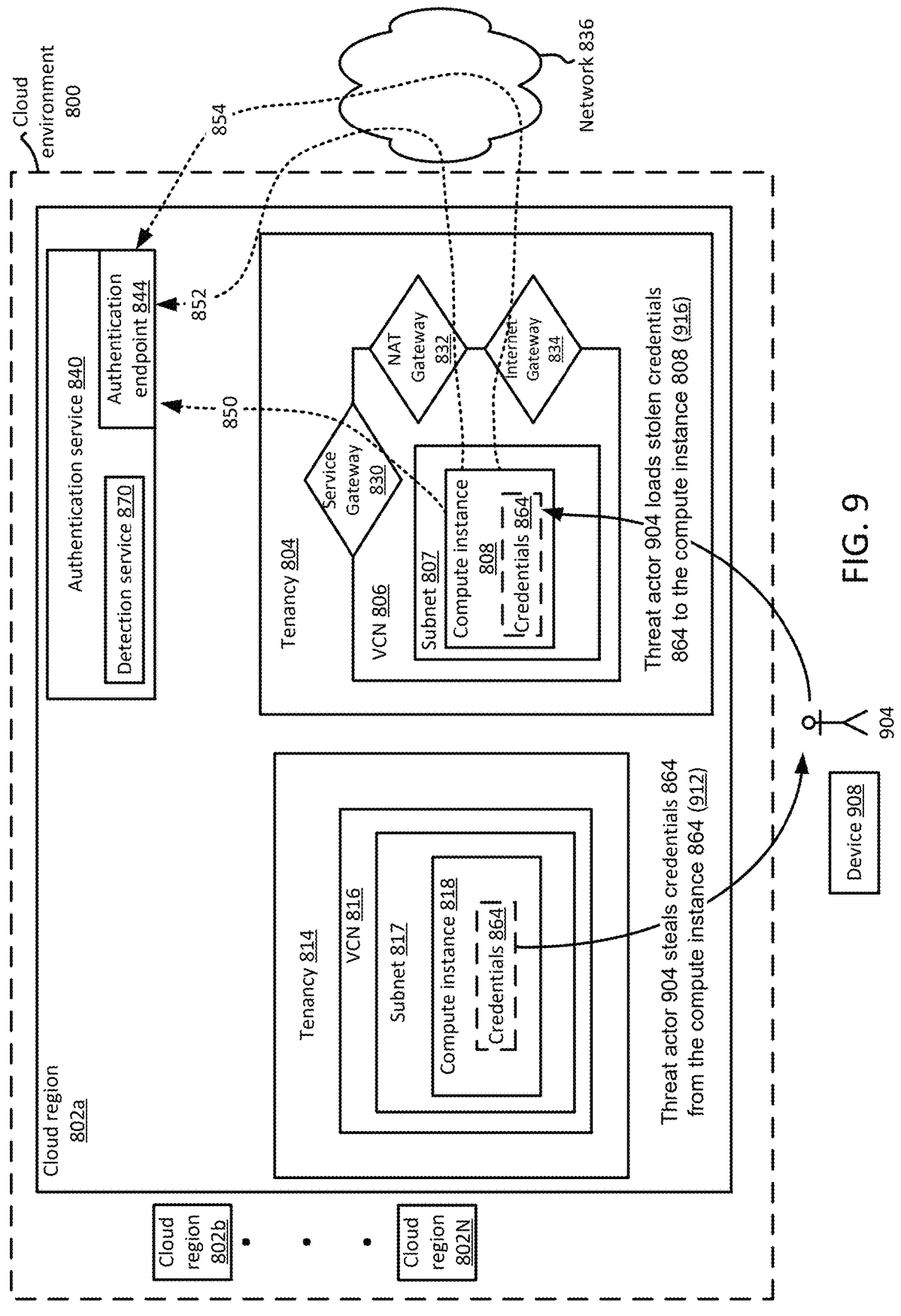
FIG. 9 illustrates a block diagram of a cloud environment, and further illustrates an attempt to steal a non-user principal in the cloud environment.

FIG. 9 illustrates a block diagram of the cloud environment 800 of FIG. 8, and illustrates an attempt to steal a non-user principal in the cloud environment. The cloud environment of FIG. 9 is the same as the cloud environment of FIG. 8. For example, the tenancy 804 comprises the compute instance 808, and the tenancy 814 comprises the compute instance 818.

Also, as illustrated in FIG. 8, the compute instance 808 was originally issued the credentials 860, and the compute instance 818 was originally issued the credentials 864. However, in FIG. 9, a malicious threat actor 904 wants to steal an instance principal, such as wants to provide an instance principal of the compute instance 818 to the compute instance 808. Thus, the malicious threat actor 904 wants to load an instance principal, which is designated for the compute instance 818, to the compute instance 808, such that the compute instance 808 can pretend to be the compute instance 818. Example reasons behind such malicious acts by the threat actor 904 have been described above, e.g., with respect to FIGS. 1-3. The threat actor 904 uses a device 908 to interact with the cloud environment 800.

For example, the threat actor 904 steals the credentials 864 assigned originally to the compute instance 818, illustrated as operation 912 in FIG. 9. In an example, the threat actor 904 may legally own the tenancy 814 (e.g., the tenancy 814 may be rented out to the actor 904 by the provider of the cloud environment 800), in which case the actor 904 has legitimate and easy access to the compute instance 818 and the corresponding credentials 864. In another example, the actor 904 maliciously steals the credentials 864 from the compute instance 818 of the tenancy 814.

The actor 904, using malicious means, gets illegitimate access or control of the compute instance 808 within the tenancy 804. Once the actor 904 has (i) access to the credentials 864 that were originally issued to the compute instance 818 and (ii) control over compute instance 808, the actor 904 loads the credentials 864 to the compute instance 808 of the tenancy 804. The loading of the stolen credentials 864 to the compute instance 808 of the tenancy 804 may be performed using any malicious operation on the compute instance 808. Now the compute instance 808 is considered to be infected (as stolen credentials 864 are loaded to the compute instance 808).

Once the stolen credentials 864 are maliciously loaded to the compute instance 808, the actor 904 causes the compute instance 808 to transmit an authentication request to the authentication service 840, which is a request for an instance principal for the compute instance 808 using the stolen credentials 864. The request for the instance principal for the compute instance 808 may be transmitted by the compute instance 808 to the authentication endpoint 844 over any of the traffic paths 850, 852, or 854, e.g., via the service gateway 830, the NAT gateway 832, or the internet gateway 834, respectively.

The authentication service 840 verifies the credentials 864. Note that the credentials 864 are legitimate in the sense that the credentials 864 were legitimately issued to a compute instance of the cloud environment 800 (such as legitimately issued to the compute instance 818). Accordingly, the authentication service 840 may issue an instance principal to the compute instance 808.

However, the credentials 864 were originally issued to the compute instance 818. Accordingly, the instance principal issued to the compute instance 808, based on the credentials 864, is supposed to be for the compute instance 818. Thus, the instance principal of the compute instance 818 is now issued to the compute instance 808. Thus, whenever the compute instance 808 uses the issued instance principal, the compute instance 808 can identify itself as the compute instance 818. This results in sealing of the instance principal of the compute instance 818 and using it for the compute instance 808. The compute instance 808 may use the instance principal of the compute instance 818 for malicious and fraudulent activities. Example use cases behind such stealing of the instance principal have been described above, e.g., with respect to FIGS. 1-3.

Figure 10:
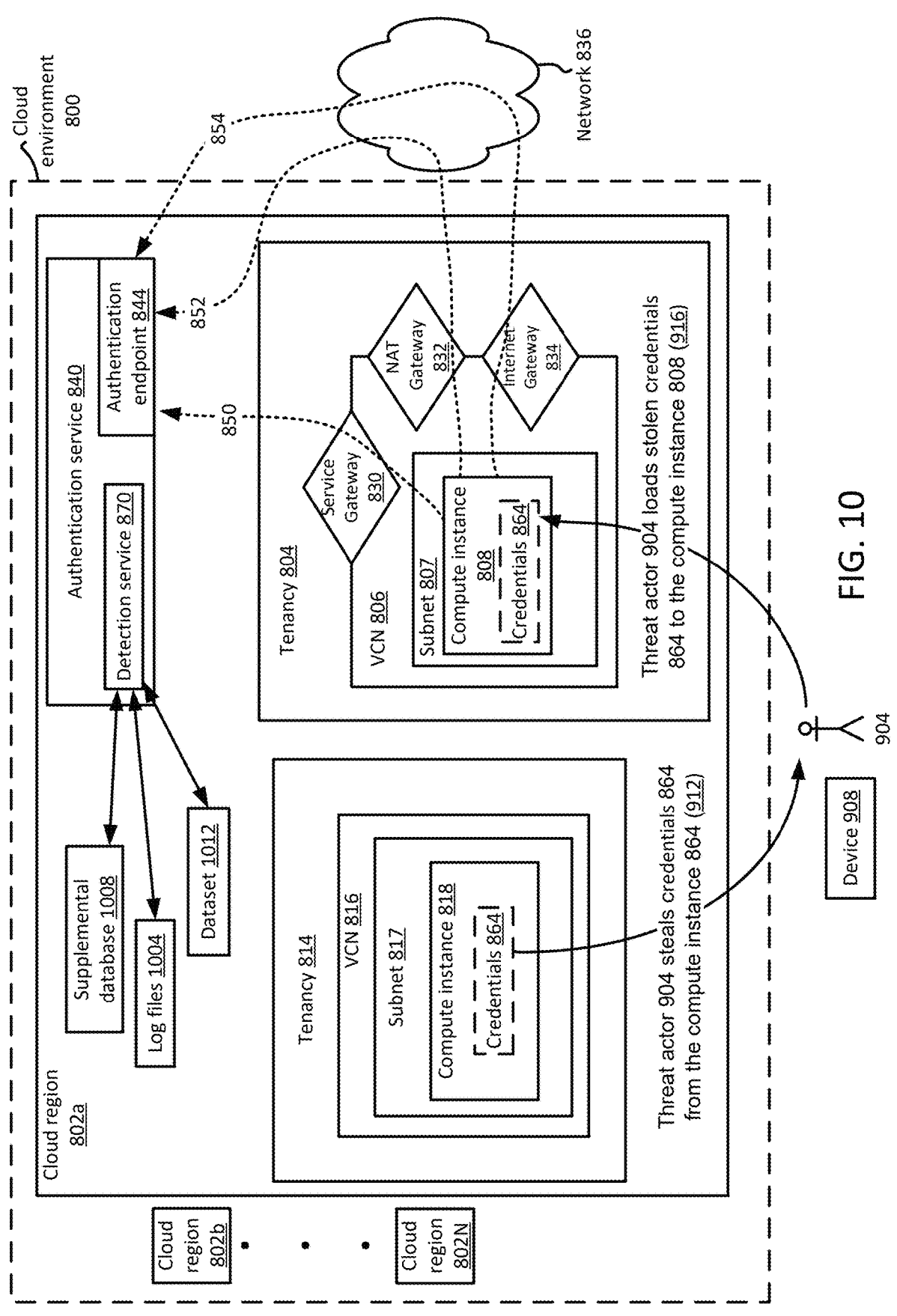
FIG. 10 illustrates a block diagram of a cloud environment, in which a detection service detects an attempt to seal an instance principal by an infected compute instance, whereas the instance principal is intended to identify a different compute instance.

FIG. 10 illustrates a block diagram of the cloud environment 800 of FIGS. 8 and 9, in which the detection service 870 detects an attempt to seal an instance principal by an infected compute instance 808, whereas the instance principal is intended to identify a different compute instance 818. The cloud environment 800 of FIG. 10 is the same as the cloud environment 800 of FIGS. 8 and 9. For example, the malicious actor 904 loads the stolen credentials 864 of the compute instance 818 of the tenancy 814 onto the compute instance 808 of the tenancy 804. For example, the compute instance 808 transmits an authentication request (such as a request for an instance principal) to the authentication endpoint 844 using the stolen credentials 864 and through any of the traffic paths 850, 852, or 854.

Note that as described above, the example of FIG. 10 is directed specifically towards stealing an instance principal. However, the teaching of this disclosure is not limited to stealing an instance principal, and may be applicable to stealing any non-user principal, such as an instance principal, or a resource principal, or a service principal. For examples in which an attempt is made to steal a resource principal, a cloud resource transmits an authentication request (such as a request for a resource principal) to the authentication endpoint 844 using stolen credentials intended for another cloud resource. Similarly, for examples in which an attempt is made to steal a service principal, a cloud service transmits an authentication request (such as a request for a service principal) to the authentication endpoint 844 using stolen credentials intended for another cloud service.

In an example, to detect attempts to steal the instance principal, the detection service 870 operates within, or in conjunction with, the authentication service 840. The detection service 870, in an example, is operated by the provider of the cloud environment 100 and/or by the cloud customer to whom the tenancy 804 is rented to.

In an example, the detection service 870 can detect the stealing of a non-user principal in real or near-real time (e.g., when the stealing is happening), and can prevent or at least reduce possibilities of the stealing. For example, if stealing is suspected, the request for the instance principal may be blocked, such that no instance principal is issued based on the request.

In another example, the detection service 870 can review past logs, and detect the stealing after the stealing has occurred. In such an example, the detection service 870 can warn the cloud provider or a cloud customers of one or more tenancies affected by the stealing. In an example, the detection service 870 can flag the stolen non-user principal, and/or revoke or rescind the stolen non-user principal.

In an example, the detection service 870 accesses one or more log files 1004 associated with receipt of the authentication request (e.g., which comprises a request for an instance principal). For example, the authentication request is transmitted by the compute instance 808 to the authentication endpoint 844 through one of the traffic paths 850, 852, or 854, and is accompanied by the stolen credentials 864.

In an example, the log files 1004 may be generated by a gateway (such as any of the gateways 830, 832, 834) through which the authentication request is transmitted. In another example, the log files 1004 may be generated by the authentication endpoint 844. In an example, the log files 1004 may be generated by the IDDP (not illustrated in FIG. 10). In any case, the log files 1004 are generated by an appropriate component of the cloud environment 800, and is associated with a receipt (e.g., by the authentication service 840 or a gateway) of the authentication request.

In an example, in order to detect stealing of non-user principals, the detection service 870 gains visibility about the authentication request using at least in part the log files 1004. FIG. 11 illustrates example contents of log files 1004 that are accessible to a detection service 870 of the cloud environment 800 of FIGS. 8-10, where the detection service 870 is configured to detect stealing of non-user principals within the cloud environment 800. As illustrated in FIG. 11, in an example, the log files 1004 includes one or more of (i) an internal host log, (ii) a virtual network interface card (VNIC) log, (iii) an IDDP log, and/or (iv) a cloud environment audit log. In an example, the contents of the log files 1004 depicted in FIG. 11 are mere examples, and the log files 1004 may include additional logs as well.

The internal host log generally logs information associated with traffic within the cloud environment 800. In an example, the internal host log also logs information associated with one or more commands input from a command prompt of a compute instance. For example, in response to the compute instance 808 transmitting the request to the authentication endpoint 844, an internal host log is generated.

The VNIC log is generated in response to requests transmitted to a VNIC of the compute instance 808. Thus, when the compute instance 808 is to use a gateway to transmit the authentication request via the VNIC, the corresponding VNIC log is generated. In an example, the VNIC log includes instance metadata service log, and/or information associated with the authentication request.

IDDP logs, as also described above, are logs generated based on receipt of the authentication request at a gateway or the authentication service 840. In an example, the cloud environment audit log may be generated based on auditing one or more actions taken within the cloud environment 800.

In an example and as illustrated in FIG. 10, in addition to the log files 1004, the detection service 870 also accesses supplemental database 1008, which aids in detection of stealing of a non-user principal. In an example, the supplemental database 1008 includes additional information associated with cloud entities within the cloud environment 800.

FIG. 12 illustrates example entries of the supplemental database 1008 that is accessible to a detection service 870 of the cloud environment 800 of FIGS. 8-10, where the detection service 870 is configured to detect stealing of non-user principals within the cloud environment 800. As illustrated in FIG. 12, in an example, the supplemental database 1008 includes one or more of (i) IP address inventory within the cloud environment 800, (ii) non-user entity inventory in the cloud environment 800, and/or (iii) one or more external datasets.

The IP address inventory (e.g., as included within the supplemental database 1008) comprises an inventory of IP addresses associated with one or more (such as a plurality of, or all of) the tenancies of the cloud environment 800. For example, the inventory database 1008 includes public IP addresses and/or private IP addresses assigned to various entities (such as non-user entities, gateways, VCNs, etc.) within one or more tenancies (such as the tenancies 804, 814) the cloud environment 800. Thus, an IP address (public or private IP address) assigned to the compute instance 808 or to a gateway may be included in the IP address inventory, along with an identification of one or more of (i) the entity to whom the IP address is assigned, (ii) the VCN 806 including the entity to whom the IP address is assigned, and/or (iii) the subnet 807 including the entity to whom the IP address is assigned.

The non-user entity inventory (e.g., as included within the supplemental database 1008) includes an inventory of a plurality of (such as all of) cloud entities within the cloud environment 800. Thus, the detection service 870 is aware of cloud resources, compute instance, VCNs, services, etc. operating within one or more tenancies of the cloud environment 800.

In an example, the external datasets (e.g., as included within the supplemental database 1008), among other things, lists IP addresses that do not originate within the cloud environment 800, but are associated with one or more cloud customers operating within the cloud environment 800. For example, if a cloud customer of the cloud environment 800 has one or more off-cloud public IP addresses within the off-cloud network of the cloud customer, the customer may share such a list of the public IP addresses with the cloud provider. The cloud provider may include such a list of off-cloud public IP addresses within the external datasets. In an example, the cloud customer may share at least those off-cloud public IP addresses of the cloud customer, from which non-user principal authentication requests may be transmitted to the authentication endpoint 844.

In an example, when a non-user principal authorization request (e.g., the authentication request described above) is received at the authentication endpoint 844, the detection service 870 has access to a dataset 1012, which includes information associated with the non-user principal authorization request. In an example, the detection service 870 builds the dataset 1012, e.g., based on one or more of the log files 1004 associated with the non-user principal authorization request and/or the supplemental database 1008.

FIG. 13 illustrates example entries of a dataset 1012 accessible to a detection service 870 of a cloud environment 800. As described above, the dataset 1012 is generated in response to the non-user principal authorization request (e.g., the authentication request described above), and is generated based on one or more of the log files 1004 associated with the non-user principal authorization request and/or the supplemental database 1008.

In an example, the dataset 1012 includes an ID of a non-user entity requesting the non-user principal. For example, this is the ID of the non-user entity, from which the request for the non-user principal originated. In the context of the cloud environment 800 described above with respect to FIGS. 8-10, because the compute instance 808 is transmitting the request for the principal, this would be the ID of the compute instance 808.

In an example, the dataset 1012 includes a type of non-user principal requested. In the context of the cloud environment 800 described above with respect to FIGS. 8-10, this would be an instance principal, as the compute instance 808 is requesting the principal. In other examples, the type of non-user principal requested may be a service principal or a resource principal.

In an example, the dataset 1012 includes a name of the non-user entity requester. For example, if the requester is a service requesting a service principal, the name of the non-user entity requester may be a name of the service.

In an example, the dataset 1012 includes an ID of a VCN initiating the request, e.g., if the request is received via the service gateway 830. For example, this is the ID of the VCN, from which the request for the non-user principal originated. In the example of the cloud environment 800, the VCN ID is the ID of the VCN 806, in case the request for the non-user principal is received through the service gateway 830 via the traffic path 850.

In an example, the dataset 1012 includes an IP address of the non-user entity from which the request for the non-user principal originated. For example, if the request for the non-user principal is transmitted through the NAT gateway 832 and via the traffic path 852, a private IP address of the compute instance 808 may be included within the dataset 1012. In another example, if the request for the non-user principal is transmitted through the internet gateway 834 and via the traffic path 854, a public IP address of the compute instance 808 may be included within the dataset 1012. In yet another example, the non-user entity from which the request has originated may be off-cloud (e.g., outside the cloud environment 800), and the dataset may include a public IP address of the originator of the request.

In an example, the dataset 1012 includes the ID of the target tenancy from which the request originated. Because the non-user principal is to be issued to the compute instance 808, the target tenancy would be the tenancy including the compute instance 808, which is the tenancy 804. In an example, the target tenancy is the tenancy where the principal is requesting the authentication endpoint 844 to perform an action, such as granting the principal to the compute instance 808 of the tenancy 804.

In an example, the dataset 1012 includes the ID of a request tenancy, which is a tenancy where the non-user entity, as indicated by the credentials 864, resides. As the credentials 864 indicates that the credentials 864 belong to the compute instance 818, the request tenancy is the tenancy 814. Note that for FIGS. 8-10, the target tenancy and the request tenancy are different.

In an example, the dataset 1012 includes an identification of a request operation, which is a grant of a non-user principal (such as grant of an instance principal in the example of FIGS. 8-10).

In an example, the dataset 1012 includes an identification of one or more requested permissions, which may include one or more permissions the non-user principal is requesting in the target tenancy.

In an example, the dataset 1012 includes an identification of one or more authorized permissions, which may include one or more permissions the non-user principal is granting in the target tenancy.

In an example, the dataset 1012 includes an identification of a resource kind, which may be a type of non-user entity initiating the request, which may be a compute instance for the example of FIGS. 8-10.

In an example, using the log files 1004, the supplemental database 1008, and/or the dataset 1012, the detection service 870 detects possibly anomalous or malicious requests for non-user principals. For example, using one or more of the above-described data, the detection service 870 can determine when a request for a non-user principal is out of line. Following are example use cases of the detection service 870 detecting such anomalous requests, although there may be other examples by which the detection service 870 can detect such anomalous requests. For example, the detection service 870 detects an originating information of the request for the non-user principal, and detects anomaly associated with such originating information.

In an example, the detection service 870 detects anomaly within the originating information associated with the request for the non-user principal, e.g., when the request for the non-user principal originates from an unexpected or anomalous public IP address within the cloud environment

800. In this example, the request is coming from a public IP address assigned to a tenancy of the cloud environment 800. However, the public IP address from which the request is received is not assigned to the tenancy where the non-user entity, to whom the credentials 864 were assigned, exists. For example, in FIGS. 8-10, the credentials 864 were assigned to compute instance 818 within the tenancy 814, and hence, the request is expected to be received from a public IP address within the tenancy 814. However, the request is actually received from a public IP address of the compute instance 808 within the tenancy 804. Thus, the request is expected to be received from tenancy 814, but is actually received from tenancy 804. The detection service 870 detects such a mismatch, and accordingly, detects anomaly within the originating information associated with the request for the non-user principal. Threat actors can and do operate on the cloud environment, they may attack the cloud environment from within the cloud environment. The threat actor may do so, so as to obfuscate their tracks. However, because the detection service 870 has access to the above-described supplemental database 1008, the detection service 870 is aware of the public IP addresses assigned to the various tenancies of the cloud environment. Accordingly, using at least in part the supplemental database 1008, the detection service 870 can detect mismatch between (i) a first tenancy including the public IP address from which the request is received (which is tenancy 804) and (ii) a second tenancy including the public IP address from which the request is expected to be received (which is tenancy 814). As described above, based on detection of such a mismatch, the detection service 870 detects the anomaly within the originating information associated with the request for the non-user principal. Note that in this example, the request is received from a public IP address, and hence, in an example, that the request is routed through the internet gateway 834 and via the traffic path 854.

In yet another example, the detection service 870 detects anomaly within the originating information associated with the request for the non-user principal, e.g., when the request for the non-user principal originates from an unexpected private IP address within the cloud environment 800. In this example, the request is coming from a private IP address assigned to a tenancy of the cloud environment 800. However, the private IP address from which the request is received is not assigned to the tenancy where the non-user entity, to whom the credentials 864 were assigned, exists. For example, in FIGS. 8-10, the credentials 864 were assigned to compute instance 818 within the tenancy 814, and hence, the request is expected to be received from a private IP address within the tenancy 814. However, the request is actually received from a private IP address of the compute instance 808 within the tenancy 804. Thus, the request is expected to be received from tenancy 814, but is actually received from tenancy 804. The detection service 870 detects such a mismatch, and accordingly, detects anomaly within the originating information associated with the request for the non-user principal. In an example, because the detection service 870 has access to the above-described supplemental database 1008, the detection service 870 is aware of the private IP addresses assigned to the various tenancies of the cloud environment. Accordingly, using at least in part the supplemental database 1008, the detection service 870 can detect the above-described mismatch between (i) a first tenancy including the private IP address from which the request is received (which is tenancy 804) and (ii) a second tenancy including the private IP address from which the request is expected to be received (which is tenancy 814). Note that in this example, the request is received from a private IP address, and hence, in an example, that the request is routed through the NAT gateway 832 and via the traffic path 852.

In yet another example, the detection service 870 detects anomaly within the originating information associated with the request for the non-user principal, e.g., when the request for the non-user principal originates from an unexpected VCN. In this example, the request originates from the VCN 806 of the cloud environment 800. However, the VCN 806 from which the request is received does not include the compute instance 818 to whom the credentials 864 were originally assigned. For example, in FIGS. 8-10, the credentials 864 were assigned to compute instance 818 within the VCN 816, and hence, the request is expected to be received from the VCN 816. However, the request was actually received from the VCN 806. Thus, the request is expected to be received from VCN 816, but was actually received from VCN 806. The detection service 870 detects such a mismatch, and accordingly, detects anomaly within the originating information associated with the request for the non-user principal. Once the detection service 870 receives a request from a non-user entity having an ID, the detection service 870 maps the ID of the non-user entity to the corresponding VCN ID that includes the non-user entity (e.g., using the log files 1004 and/or the supplemental database 1008 described above). Also, in an example, the credentials 864 received within the request include an ID of the non-user entity to which the credentials 864 were originally assigned, and the detection service 870 can similarly detect a corresponding VCN (such as the VCN 816) from which the request is expected to originate. Any mismatch between the VCN from which the request is expected versus the actual VCN from which the request is received can then be detected, and the corresponding request is then flagged as being anomalous.

Thus, for the above-described examples of detecting anomalous requests for non-user principals, the detection service 870 (*i*) determines that the originating information is indicative of a first attribute of a requesting entity from which the request originated, and (ii) determines a second attribute of an original entity to which credentials 864, which accompanies the request, were assigned. The first attribute may be, for example, an ID of the tenancy 804, or an ID of the VCN 806. The second attribute may be, for example, an ID of the tenancy 814, or an ID of the VCN 816. The detection service 870 detects a mismatch between the first attribute and the second attribute, and accordingly, detects an anomaly associated with the originating information of the request. Accordingly, the detection service 870 flags the request for the non-user principal to be anomalous, in an example.

In a further example, the detection service 870 detects anomaly within the originating information associated with the request for the non-user principal, e.g., when the request for the non-user principal is for one or more operations that are unexpected. For example, a non-user principal can be configured with relevant policies or permissions. In an example, the requested non-user principal may be for performing one or more operations by the non-user entity. From the log files 1004, the detection service 870 identifies one or more operations for which the non-user principal is requested. If the request for the non-user principal is for performing operations that are outside the general or specific operations permitted to the non-user entity, this may raise suspicion as to whether there is an effort to steal the principal. For example, if an instance principal is attempting to create users for a tenancy (e.g., when the compute instance is not supposed to create users), or edit user multi-function authorization (MFA) settings (e.g., when the compute instance is not supposed to edit MFA settings), the detection service 870 may appropriately raise an anomalous flag for such requests.

Figure 13A:
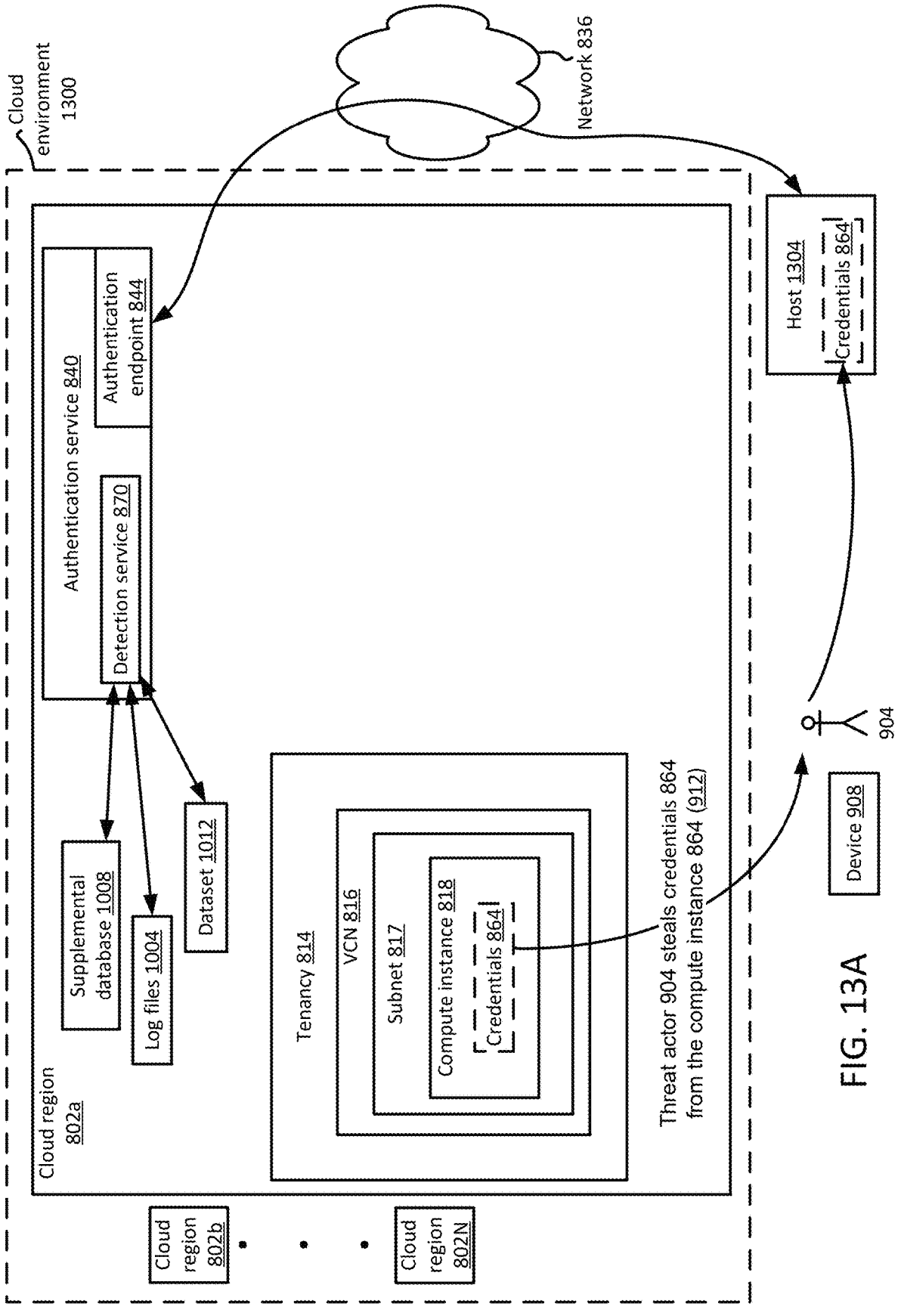
FIG. 13A illustrates a block diagram of a cloud environment in which a detection service detects an attempt to seal an instance principal by an infected host that is outside the cloud environment, whereas the instance principal is intended to identify a different compute instance.

In yet another example, the detection service 870 detects anomaly within the originating information associated with the request for the non-user principal, e.g., when the request for the non-user principal originates outside the cloud environment 800. For example, to detect anomaly within the originating information associated with the request for the non-user principal, the detection service 870 determines if the request for the non-user principal is originating from outside the cloud environment 800. Note that this scenario is not illustrated in FIGS. 8-10, where the compute instance 808 transmitting the request is within the cloud environment 800. Rather, in this scenario, the requesting compute instance is outside the cloud environment 800. For example, FIG. 13A illustrates a block diagram of a cloud environment 1300, in which a detection service 870 detects an attempt to seal an instance principal by an infected host 1304 that is outside the cloud environment 1300, whereas the instance principal is intended to identify a different compute instance 818. The cloud environment 1300 of FIG. 13A is at least in part similar to the cloud environment 800 of FIGS. 8-10. However, in FIGS. 8-10, the infected compute instance 808 (e.g., to which the stolen credentials 864 were loaded) was within a tenancy of the cloud environment 800. In contrast, the threat actor 904 uploads the stolen credentials 864 to an external host 1304 that is outside the compute instance 800.

Note that in an example, a compute instance outside the cloud environment 800 may legitimately transmit a request for a non-user principal. However, as described above, the external datasets (e.g., as included within the supplemental database 1008), among other things, lists IP addresses that do not originate within the cloud environment 800, but are associated with one or more cloud customers operating within the cloud environment 800. Thus, in an example, (i) if the request for the non-user principal originates from outside the cloud environment 800 and (ii) if the IP address from the originating entity is not included within the list of safe IP addresses within the external datasets, then the detection service 870 flags the request for the non-user principal as possibly being anomalous. For example, if the request is from a non-cloud environment IP address (e.g., which is not within the safe list of non-cloud IP addresses within the external datasets), this implies that someone has exfiltrated the instance credentials (e.g., such as credentials 864) and are trying the steal the principal from outside the cloud environment 800, or may be operating a VPN or some other type of external service that forced traffic to route from an external source back to the authentication endpoint 844 of the cloud environment 100. Upon such detection, the detection service 870 flags the request to be possibly anomalous. On the other hand, if the request is from a non-cloud environment IP address and is listed within the safe list of non-cloud IP addresses of the external datasets, this implies that the request is legitimate (e.g., from a legitimate cloud customer operating off-cloud and requesting the principal for an off-cloud non-user entity). Thus, in the example of FIG. 13A, the detection service 870 detects whether an IP address of the host 1304 is within the safe list of non-cloud IP addresses of the external datasets. If the IP address of the host 1304 is not within the safe list of non-cloud IP addresses of the external datasets, the detection service 870 flags a request from the host 1304 and for the non-user principal to be possibly anomalous.

FIG. 14 illustrates a flow diagram depicting a method 1400 for detecting attempts to steal a non-user principal within the cloud environment 800 of FIG. 8-10. At 1404, a request for a non-user principal to be used within a cloud environment is received, e.g., at the authentication endpoint 844.

At 1408, a log that includes information associated with a receipt of the request for the non-user principal is accessed. For example, the detection service 870 accesses the log files 1004, and also accesses the supplemental database 1008.

At 1412, based at least in part on the log, originating information of the request is determined. For example, the detection service 870 generates the dataset 1012 including the originating information of the request, e.g., based at least in part on the log files 1004 and the supplemental database 1008.

At 1416, an anomaly associated with the originating information of the request is detected. For example, the detection service 870 flags the request as being anomalous. Various example use cases for such anomalous flag have been described above in detail.

At 1420, in response to detecting the anomaly associated with the originating information of the request, information indicative of the detected anomaly associated with the originating information of the request is caused to be presented at a user interface. Such presentation of the information may be for personal of the cloud provider and/or personal of the cloud customer of the tenancies 804 and/or 814.

At 1424, a non-user entity from which the request originated is identified, e.g., by the detection service 870. At 1428, the detection service 870 flags the identified non-user entity as a risk and causes to undertake protective actions against the non-user entity.

Computer System Architecture

Figure 15:
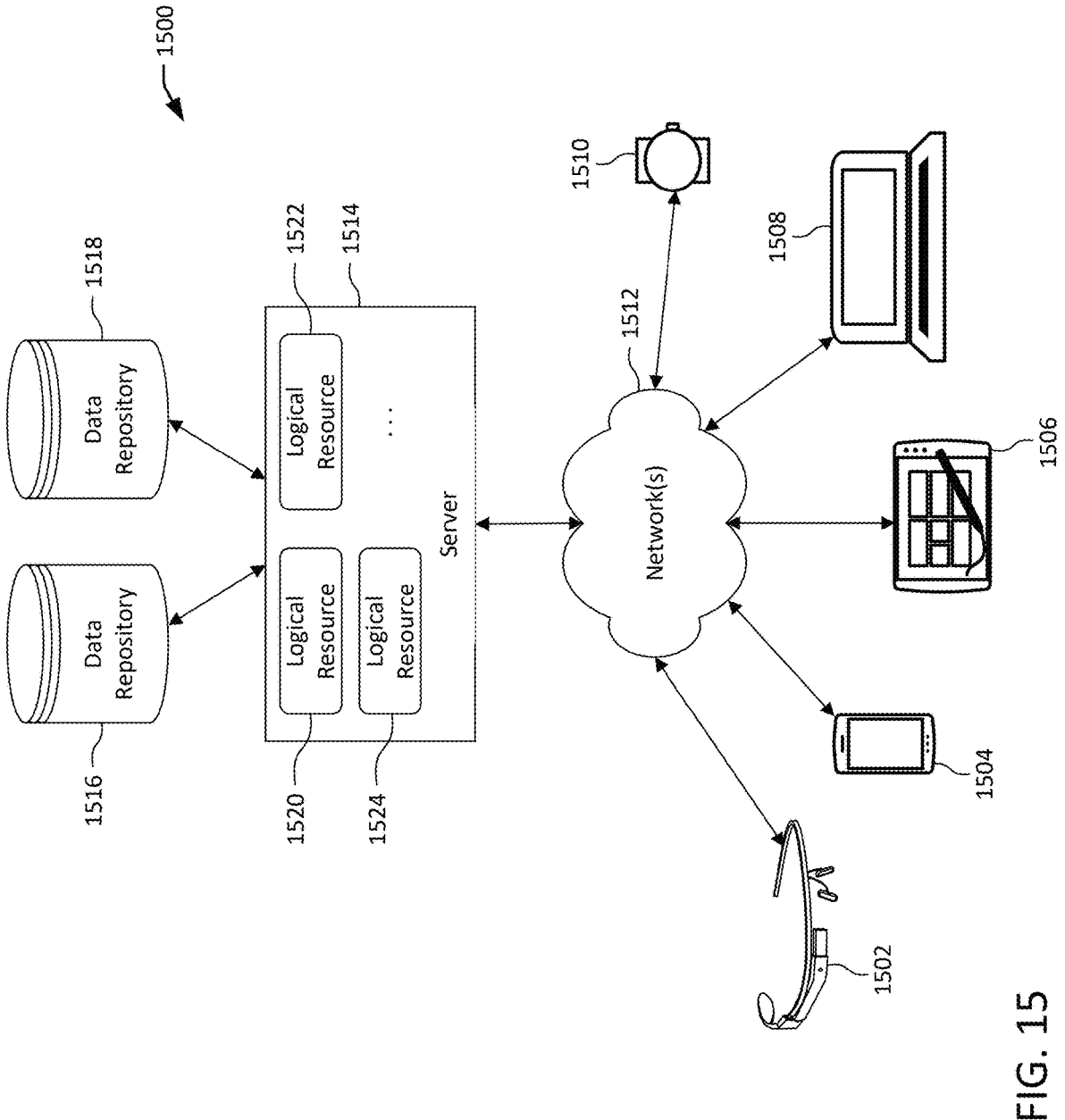
FIG. 15 depicts a simplified diagram of a distributed system for implementing certain aspects.

FIG. 15 depicts a simplified diagram of a distributed system 1500 for implementing an embodiment. In the illustrated embodiment, distributed system 1500 includes one or more client computing devices 1502, 1504, 1506, 1508, and/or 1510 coupled to a server 1514 via one or more communication networks 1512. Clients computing devices 1502, 1504, 1506, 1508, and/or 1510 may be configured to execute one or more applications.

In an example, server 1514 may be adapted to run one or more services or software applications that enable techniques for detecting inter-tenancy exfiltration in a cloud environment, and/or detecting stealing of principals (such as non-user principals) in a cloud environment.

In certain aspects, server 1514 may also provide other services or software applications that can include non-virtual and virtual environments. In some aspects, these services may be offered as web-based or cloud services, such as under a Software as a Service (SaaS) model to the users of client computing devices 1502, 1504, 1506, 1508, and/or 1510. Users operating client computing devices 1502, 1504, 1506, 1508, and/or 1510 may in turn utilize one or more client applications to interact with server 1514 to utilize the services provided by these components.

In the configuration depicted in FIG. 15, server 1514 may include one or more components 1520, 1522 and 1524 that implement the functions performed by server 1514. These components may include software components that may be executed by one or more processors, hardware components, or combinations thereof. It should be appreciated that various different system configurations are possible, which may be different from distributed system 1500. The embodiment shown in FIG. 15 is thus one example of a distributed system for implementing an embodiment system and is not intended to be limiting.

Users may use client computing devices 1502, 1504, 1506, 1508, and/or 1510 for techniques for detecting inter-tenancy exfiltration in a cloud environment, and/or detecting stealing of principals (such as non-user principals) in a cloud environment, in accordance with the teachings of this disclosure. A client device may provide an interface that enables a user of the client device to interact with the client device. The client device may also output information to the user via this interface. Although FIG. 15 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 1512 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1512 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1514 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 1514 can include one or more virtual machines running virtual operating systems, or other computing architectures involving virtualization such as one or more flexible pools of logical storage devices that can be virtualized to maintain virtual storage devices for the server. In various aspects, server 1514 may be adapted to run one or more services or software applications that provide the functionality described in the foregoing disclosure.

The computing systems in server 1514 may run one or more operating systems including any of those discussed above, as well as any commercially available server operating system. Server 1514 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 1514 may include one or more applications to analyze and consolidate data feeds and/or event updates received from users of client computing devices 1502, 1504, 1506, 1508, and/or 1510. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1514 may also include one or more applications to display the data feeds and/or real-time events via one or more display devices of client computing devices 1502, 1504, 1506, 1508, and/or 1510.

Distributed system 1500 may also include one or more data repositories 1516, 1518. These data repositories may be used to store data and other information in certain aspects. For example, one or more of the data repositories 1516, 1518 may be used to store information for techniques for detecting inter-tenancy exfiltration in a cloud environment, and/or detecting stealing of principals (such as non-user principals) in a cloud environment. Data repositories 1516, 1518 may reside in a variety of locations. For example, a data repository used by server 1514 may be local to server 1514 or may be remote from server 1514 and in communication with server 1514 via a network-based or dedicated connection. Data repositories 1516, 1518 may be of different types. In certain aspects, a data repository used by server 1514 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 1516, 1518 may also be used by applications to store application data. The data repositories used by applications may be of different types such as, for example, a key-value store repository, an object store repository, or a general storage repository supported by a file system.

In one embodiment, server 1514 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 16:
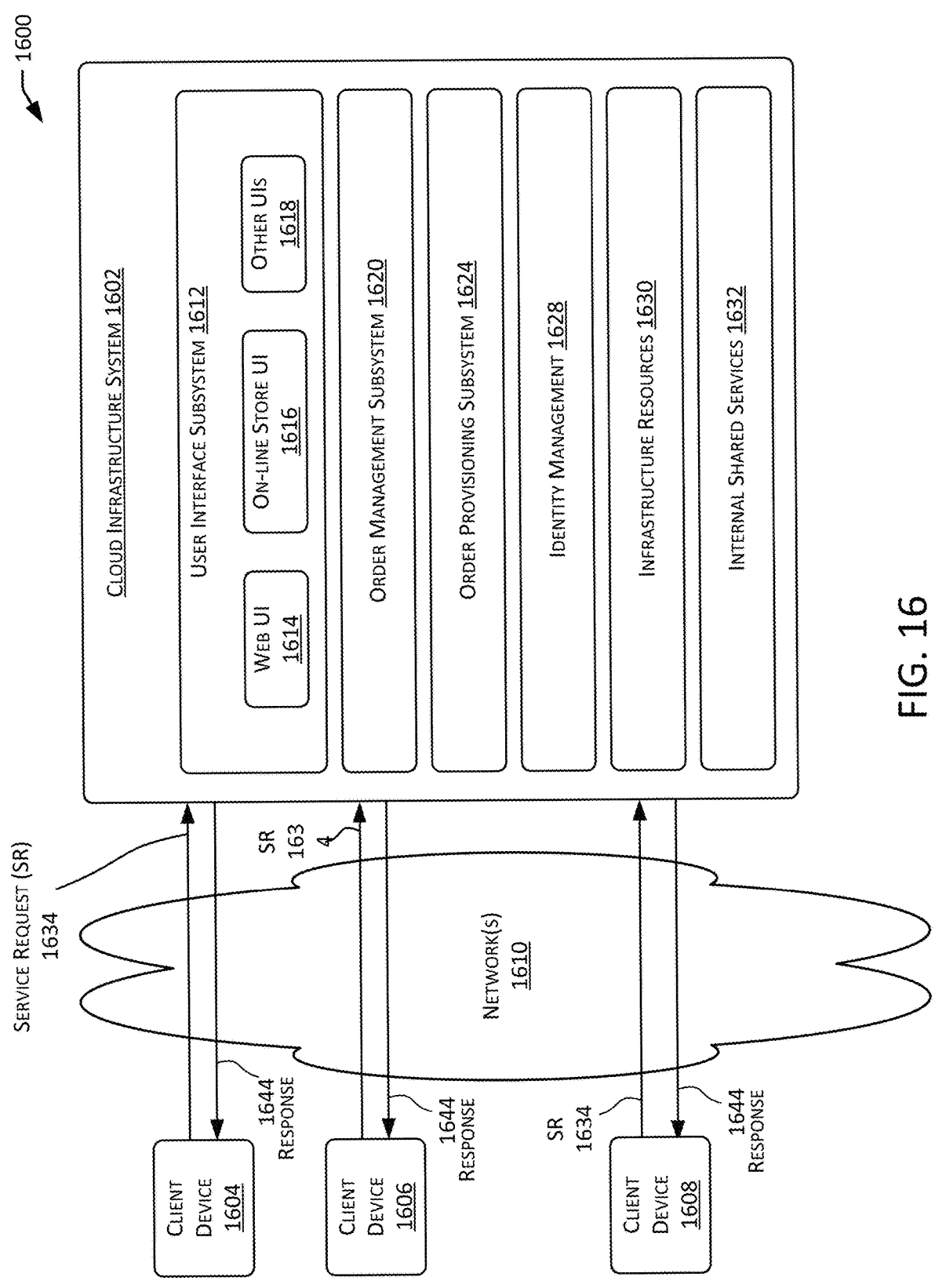
FIG. 16 is a simplified block diagram of one or more components of a system environment by which services provided by one or more components of an embodiment system may be offered as cloud services, in accordance with certain aspects.

FIG. 16 is a simplified block diagram of a cloud-based system environment that enables techniques for detecting inter-tenancy exfiltration in a cloud environment, and/or detecting stealing of principals (such as non-user principals) in a cloud environment, in accordance with certain aspects. In the embodiment depicted in FIG. 16, cloud infrastructure system 1602 may provide one or more cloud services that may be requested by users using one or more client computing devices 1604, 1606, and 1608. Cloud infrastructure system 1602 may comprise one or more computers and/or servers that may include those described above for server 1512. The computers in cloud infrastructure system 1602 may be organized as general purpose computers, specialized server computers, server farms, server clusters, or any other appropriate arrangement and/or combination.

Network(s) 1610 may facilitate communication and exchange of data between clients 1604, 1606, and 1608 and cloud infrastructure system 1602. Network(s) 1610 may include one or more networks. The networks may be of the same or different types. Network(s) 1610 may support one or more communication protocols, including wired and/or wireless protocols, for facilitating the communications.

The embodiment depicted in FIG. 16 is only one example of a cloud infrastructure system and is not intended to be limiting. It should be appreciated that, in some other aspects, cloud infrastructure system 1602 may have more or fewer components than those depicted in FIG. 16, may combine two or more components, or may have a different configuration or arrangement of components. For example, although FIG. 16 depicts three client computing devices, any number of client computing devices may be supported in alternative aspects.

The term cloud service is generally used to refer to a service that is made available to users on demand and via a communication network such as the Internet by systems (e.g., cloud infrastructure system 1602) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 1610 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 1602 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 1602 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 1602. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 1602. Cloud infrastructure system 1602 then performs processing to provide the services requested in the tenant's subscription order. Cloud infrastructure system 1602 may be configured to provide one or even multiple cloud services.

Cloud infrastructure system 1602 may provide the cloud services via different deployment models. In a public cloud model, cloud infrastructure system 1602 may be owned by a third party cloud services provider and the cloud services are offered to any general public tenant, where the tenant can be an individual or an enterprise. In certain other aspects, under a private cloud model, cloud infrastructure system 1602 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 1602 and the services provided may be shared by several organizations in a related community. Various other models such as hybrids of the above mentioned models may also be used.

Client computing devices 1604, 1606, and 1608 may be of different types (such as devices 1502, 1504, 1506, and 1508 depicted in FIG. 15) and may be capable of operating one or more client applications. A user may use a client device to interact with cloud infrastructure system 1602, such as to request a service provided by cloud infrastructure system 1602.

In some aspects, the processing performed by cloud infrastructure system 1602 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1602 for determining the intent of an utterance. The data used for this analysis may include structured data (e.g., data stored in a database or structured according to a structured model) and/or unstructured data (e.g., data blobs (binary large objects)).

As depicted in the embodiment in FIG. 16, cloud infrastructure system 1602 may include infrastructure resources 1630 that are utilized for facilitating the provision of various cloud services offered by cloud infrastructure system 1602. Infrastructure resources 1630 may include, for example, processing resources, storage or memory resources, networking resources, and the like.

In certain aspects, to facilitate efficient provisioning of these resources for supporting the various cloud services provided by cloud infrastructure system 1602 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1602 may itself internally use services 1632 that are shared by different components of cloud infrastructure system 1602 and which facilitate the provisioning of services by cloud infrastructure system 1602. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1602 may comprise multiple subsystems. These subsystems may be implemented in software, or hardware, or combinations thereof. As depicted in FIG. 16, the subsystems may include a user interface subsystem 1612 that enables users of cloud infrastructure system 1602 to interact with cloud infrastructure system 1602. User interface subsystem 1612 may include various different interfaces such as a web interface 1614, an online store interface 1616 where cloud services provided by cloud infrastructure system 1602 are advertised and are purchasable by a consumer, and other interfaces 1618. For example, a tenant may, using a client device, request (service request 1634) one or more services provided by cloud infrastructure system 1602 using one or more of interfaces 1614, 1616, and 1618. For example, a tenant may access the online store, browse cloud services offered by cloud infrastructure system 1602, and place a subscription order for one or more services offered by cloud infrastructure system 1602 that the tenant wishes to subscribe to. The service request may include information identifying the tenant and one or more services that the tenant desires to subscribe to.

In certain aspects, such as the embodiment depicted in FIG. 16, cloud infrastructure system 1602 may comprise an order management subsystem (OMS) 1620 that is configured to process the new order. As part of this processing, OMS 1620 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 1620 may then invoke the order provisioning subsystem (OPS) 1624 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 1624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 1602 may send a response or notification 1644 to the requesting tenant to indicate when the requested service is now ready for use. In some instances, information (e.g., a link) may be sent to the tenant that enables the tenant to start using and availing the benefits of the requested services.

Cloud infrastructure system 1602 may provide services to multiple tenants. For each tenant, cloud infrastructure system 1602 is responsible for managing information related to one or more subscription orders received from the tenant, maintaining tenant data related to the orders, and providing the requested services to the tenant or clients of the tenant. Cloud infrastructure system 1602 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 1602 may provide services to multiple tenants in parallel. Cloud infrastructure system 1602 may store information for these tenants, including possibly proprietary information. In certain aspects, cloud infrastructure system 1602 comprises an identity management subsystem (IMS) 1628 that is configured to manage tenant's information and provide the separation of the managed information such that information related to one tenant is not accessible by another tenant. IMS 1628 may be configured to provide various security-related services such as identity services, such as information access management, authentication and authorization services, services for managing tenant identities and roles and related capabilities, and the like.

Figure 17:
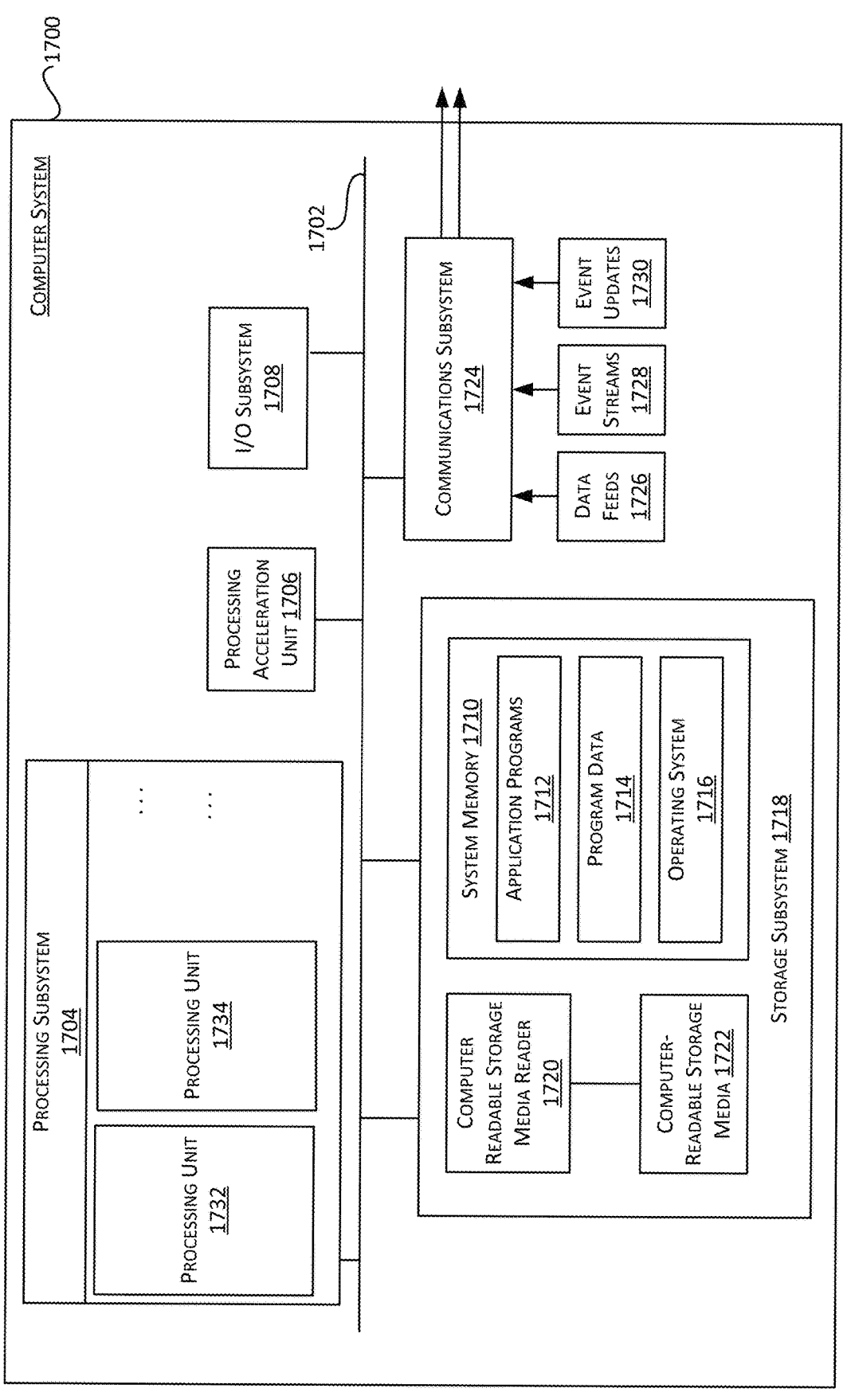
FIG. 17 illustrates an example computer system that may be used to implement certain aspects.

FIG. 17 illustrates an exemplary computer system 1700 that may be used to implement certain aspects. As shown in FIG. 17, computer system 1700 includes various subsystems including a processing subsystem 1704 that communicates with a number of other subsystems via a bus subsystem 1702. These other subsystems may include a processing acceleration unit 1706, an I/O subsystem 1708, a storage subsystem 1718, and a communications subsystem 1724. Storage subsystem 1718 may include non-transitory computer-readable storage media including storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative aspects of the bus subsystem may utilize multiple buses. Bus subsystem 1702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1704 controls the operation of computer system 1700 and may comprise one or more processors, application specific integrated circuits (ASICs), or field programmable gate arrays (FPGAs). The processors may include be single core or multicore processors. The processing resources of computer system 1700 can be organized into one or more processing units 1732, 1734, etc. A processing unit may include one or more processors, one or more cores from the same or different processors, a combination of cores and processors, or other combinations of cores and processors. In some aspects, processing subsystem 1704 can include one or more special purpose co-processors such as graphics processors, digital signal processors (DSPs), or the like. In some aspects, some or all of the processing units of processing subsystem 1704 can be implemented using customized circuits, such as application specific integrated circuits (ASICs), or field programmable gate arrays (FPGAs).

In some aspects, the processing units in processing subsystem 1704 can execute instructions stored in system memory 1710 or on computer readable storage media 1722. In various aspects, the processing units can execute a variety of programs or code instructions and can maintain multiple concurrently executing programs or processes. At any given time, some or all of the program code to be executed can be resident in system memory 1710 and/or on computer-readable storage media 1722 including potentially on one or more storage devices. Through suitable programming, processing subsystem 1704 can provide various functionalities described above. In instances where computer system 1700 is executing one or more virtual machines, one or more processing units may be allocated to each virtual machine.

In certain aspects, a processing acceleration unit 1706 may optionally be provided for performing customized processing or for off-loading some of the processing performed by processing subsystem 1704 so as to accelerate the overall processing performed by computer system 1700.

I/O subsystem 1708 may include devices and mechanisms for inputting information to computer system 1700 and/or for outputting information from or via computer system 1700. In general, use of the term input device is intended to include all possible types of devices and mechanisms for inputting information to computer system 1700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1700 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 1718 provides a repository or data store for storing information and data that is used by computer system 1700. Storage subsystem 1718 provides a tangible non-transitory computer-readable storage medium for storing the basic programming and data constructs that provide the functionality of some aspects. Storage subsystem 1718 may store software (e.g., programs, code modules, instructions) that when executed by processing subsystem 1704 provides the functionality described above. The software may be executed by one or more processing units of processing subsystem 1704. Storage subsystem 1718 may also provide a repository for storing data used in accordance with the teachings of this disclosure.

Storage subsystem 1718 may include one or more non-transitory memory devices, including volatile and non-volatile memory devices. As shown in FIG. 17, storage subsystem 1718 includes a system memory 1710 and a computer-readable storage media 1722. System memory 1710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1700, such as during start-up, may typically be stored in the ROM. The RAM typically contains data and/or program modules that are presently being operated and executed by processing subsystem 1704. In some implementations, system memory 1710 may include multiple different types of memory, such as static random access memory (SRAM), dynamic random access memory (DRAM), and the like.

By way of example, and not limitation, as depicted in FIG. 17, system memory 1710 may load application programs 1712 that are being executed, which may include various applications such as Web browsers, mid-tier applications, relational database management systems (RDBMS), etc., program data 1714, and an operating system 1716. By way of example, operating system 1716 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 1722 may store programming and data constructs that provide the functionality of some aspects. Computer-readable media 1722 may provide storage of computer-readable instructions, data structures, program modules, and other data for computer system 1700. Software (programs, code modules, instructions) that, when executed by processing subsystem 1704 provides the functionality described above, may be stored in storage subsystem 1718. By way of example, computer-readable storage media 1722 may include non-volatile memory such as a hard disk drive, a magnetic disk drive, an optical disk drive such as a CD ROM, digital video disc (DVD), a Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1718 may also include a computer-readable storage media reader 1720 that can further be connected to computer-readable storage media 1722. Reader 1720 may receive and be configured to read data from a memory device such as a disk, a flash drive, etc.

In certain aspects, computer system 1700 may support virtualization technologies, including but not limited to virtualization of processing and memory resources. For example, computer system 1700 may provide support for executing one or more virtual machines. In certain aspects, computer system 1700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1700. Accordingly, multiple operating systems may potentially be run concurrently by computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to establish a communication channel to one or more client devices via the Internet for receiving and sending information from and to the client devices.

Communication subsystem 1724 may support both wired and/or wireless communication protocols. For example, in certain aspects, communications subsystem 1724 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1724 can provide wired network connectivity (e.g., Ethernet) in addition to or instead of a wireless interface.

Communication subsystem 1724 can receive and transmit data in various forms. For example, in some aspects, in addition to other forms, communications subsystem 1724 may receive input communications in the form of structured and/or unstructured data feeds 1726, event streams 1728, event updates 1730, and the like. For example, communications subsystem 1724 may be configured to receive (or send) data feeds 1726 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1724 may be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1724 may also be configured to communicate data from computer system 1700 to other computer systems or networks. The data may be communicated in various different forms such as structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 1700 depicted in FIG. 17 is intended only as a specific example. Many other configurations having more or fewer components than the system depicted in FIG. 17 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A non-transitory computer-readable medium including instructions that when executed by one or more processors, cause a system including the one or more processors to perform operations including:

accessing a log that includes information associated with receipt of a service message at a gateway within a cloud environment;

determining, based at least in part on the log, (i) originating information indicative of an origin of the service message and (ii) target information indicative of a destination of the service message;

comparing the originating information of the service message and the target information of the service message;

detecting a mismatch between the originating information of the service message and the target information of the service message; and in response to the detected mismatch between the originating information of the service message and the target information of the service message, causing to present information indicative of the detected mismatch at a user interface.

2. The non-transitory computer-readable medium of claim 1, wherein the operation further comprises:

identifying a compute instance from which the service message originated; and in response to the detected mismatch, (i) flagging the compute instance as a risk and (ii) causing to undertake protective actions against the compute instance.

3. The non-transitory computer-readable medium of claim 1, wherein:

the originating information of the service message identifies an originating tenancy of the service message;

the target information of the service message identifies a target tenancy of the service message; and detecting the mismatch comprises detecting a mismatch between the originating tenancy and target tenancy.

4. The non-transitory computer-readable medium of claim 1, wherein determining the originating information of the service message comprises:

determining, from the log, an identification of a virtual cloud network (VCN) from which the service message originated; and mapping the identification of the VCN from which the service message originated to a tenancy, wherein the originating information of the service message identifies the tenancy.

5. The non-transitory computer-readable medium of claim 1, wherein determining the originating information of the service message comprises:
    determining, from the log, an Internet Protocol (IP) address from which the service message originated; and
    mapping the IP address from which the service message originated to a tenancy, wherein the originating information of the service message identifies the tenancy.

6. The non-transitory computer-readable medium of claim 5, wherein mapping the IP address from which the service message originated to the tenancy comprises:
    mapping the IP address from which the service message originated to an identification of a virtual cloud network (VCN); and
    mapping the identification of the VCN to the tenancy including the VCN.

7. The non-transitory computer-readable medium of claim 1, wherein determining, from the log, the originating information of the service message comprises:
    determining an identification of a compute instance from which the service message originated; and
    mapping the identification of the compute instance to a tenancy that includes the compute instance, wherein the originating information of the service message identifies the tenancy.

8. The non-transitory computer-readable medium of claim 1, wherein at least one of:
    (i) determining, from the log, a first tenancy from which the service message originated, wherein the originating information of the service message identifies the first tenancy; and
    (i) determining, from the log, a second tenancy that is the destination of the service message, wherein the target information of the service message identifies the second tenancy.

9. The non-transitory computer-readable medium of claim 1, wherein the gateway is a service gateway of the cloud environment.

10. The non-transitory computer-readable medium of claim 1, wherein the originating information of the service message identifies an originating tenancy of the service message, wherein the target information of the service message identifies a target tenancy of the service message, and wherein the operation further comprises:
    gathering, by a compute instance within the originating tenancy, data from one or more cloud resources within the originating tenancy;
    generating, by the compute instance within the originating tenancy, the service message including the data; and
    attempting to transmit, by the compute instance within the originating tenancy, the service message to the target tenancy via the gateway.

11. The non-transitory computer-readable medium of claim 1, wherein the operation further comprises:
    in response to the detected mismatch between the originating information of the service message and the target information of the service message, blocking a passage of the service message from the gateway to the destination of the service message.

12. The non-transitory computer-readable medium of claim 1, wherein the operation further comprises:
    transmitting, by a first compute instance, the service message to the destination and via the gateway, using an instance principal that is assigned to a second compute instance different from the first compute instance,
    wherein the first compute instance is within a first tenancy of the cloud environment, and the second compute instance is within a second tenancy of the cloud environment, the second tenancy different from the first tenancy.

13. The non-transitory computer-readable medium of claim 12, wherein the instance principal is stolen from the second compute instance and loaded to the first compute instance.

14. The non-transitory computer-readable medium of claim 13, wherein the first compute instance and the second compute instance are within a first tenancy and a second tenancy, respectively, of a same cloud region of the cloud environment.

15. A method comprising:
    accessing a log that includes information associated with receipt of a service message at a gateway within a cloud environment;
    determining, based at least in part on the log, (i) originating information indicative of an origin of the service message and (ii) target information indicative of a destination of the service message;
    comparing the originating information of the service message and the target information of the service message;
    detecting a mismatch between the originating information of the service message and the target information of the service message; and
    in response to the detected mismatch between the originating information of the service message and the target information of the service message, presenting information indicative of the detected mismatch at a user interface.

16. The method of claim 15, wherein:
    the originating information of the service message identifies an originating tenancy of the service message;
    the target information of the service message identifies a target tenancy of the service message; and
    detecting the mismatch comprises detecting a mismatch between the originating tenancy and target tenancy.

17. The method of claim 15, wherein determining the originating information of the service message comprises:
    determining, from the log, an identification of a virtual cloud network (VCN) or an Internet Protocol address from which the service message originated; and
    mapping the identification of the VCN or the Internet Protocol address from which the service message originated to a tenancy, wherein the originating information of the service message identifies the tenancy.

18. The method of claim 15, further comprising:
    transmitting, by a first compute instance, the service message to a target and via the gateway, using an instance principal that is assigned to a second compute instance different from the first compute instance,
    wherein the first compute instance is within a first tenancy of the cloud environment, and the second compute instance is within a second tenancy of the cloud environment, the second tenancy different from the first tenancy.

19. A system comprising:
    one or more processors; and
    one or more non-transitory computer-readable media storing instructions, which, when executed by the system, cause the system to perform a set of actions including:

accessing a log that includes information associated with receipt of a service message at a gateway within a cloud environment;

determining, based at least in part on the log, (i) originating information indicative of an origin of the service message and (ii) target information indicative of a destination of the service message;

comparing the originating information of the service message and the target information of the service message;

detecting a mismatch between the originating information of the service message and the target information of the service message; and in response to the detected mismatch between the originating information of the service message and the target information of the service message, presenting information indicative of the detected mismatch at a user interface.

20. The system of claim 19, wherein the gateway is a service gateway of the cloud environment.

* * * * *